(12) United States Patent
Kaga et al.

(10) Patent No.: US 8,700,572 B2
(45) Date of Patent: Apr. 15, 2014

(54) STORAGE SYSTEM AND METHOD FOR CONTROLLING STORAGE SYSTEM

(75) Inventors: Shigeru Kaga, Odawara (JP); Mikito Ogata, Odawara (JP); Mamoru Sato, Odawara (JP)

(73) Assignees: Hitachi, Ltd., Tokyo (JP); Hitachi Information & Telecommunication Engineering, Ltd., Yokohama-shi (JP)

( * ) Notice: Subject to any disclaimer, the term of this patent is extended or adjusted under 35 U.S.C. 154(b) by 2 days.

(21) Appl. No.: 13/383,554

(22) PCT Filed: Dec. 20, 2011

(86) PCT No.: PCT/JP2011/007113
§ 371 (c)(1),
(2), (4) Date: Jan. 11, 2012

(87) PCT Pub. No.: WO2013/093960
PCT Pub. Date: Jun. 27, 2013

(65) Prior Publication Data
US 2013/0159255 A1  Jun. 20, 2013

(51) Int. Cl.
*G06F 17/00* (2006.01)
*G06F 7/00* (2006.01)

(52) U.S. Cl.
USPC ............... 707/640; 707/664; 707/679

(58) Field of Classification Search
USPC ......................... 707/664, 640, 679
See application file for complete search history.

(56) References Cited

U.S. PATENT DOCUMENTS

| | | | |
|---|---|---|---|
| 7,539,710 B1 * | 5/2009 | Haustein et al. | ............ 1/1 |
| 2006/0259724 A1 | 11/2006 | Saika | |

(Continued)

FOREIGN PATENT DOCUMENTS

| | | |
|---|---|---|
| EP | 2 042 979 A2 | 4/2009 |
| GB | 2467239 A | 7/2010 |
| JP | 2005-092282 | 4/2005 |

OTHER PUBLICATIONS

EMC2 "Avamar, Duplication Backup Software and System"; [online] Retrieved on Nov. 7, 2011 from the Internet: <URL: http://www.emc.com/backup-and-recovery/avamar/avamar.htm>; 2 pages.

(Continued)

*Primary Examiner* — Cam Truong
(74) *Attorney, Agent, or Firm* — Foley & Lardner LLP

(57) ABSTRACT

Provided is a storage system providing a data storage area to an external apparatus. The storage system includes at least a first information processing apparatus including a first logical storage area forming the data storage area and a first data processing part performing processing of reducing the storage capacity used by a backup target data in the first logical storage area, and a second information processing apparatus communicatively coupled to the first information processing apparatus and including a second logical storage area forming the data storage area, and a second data processing part performing processing of reducing the storage capacity used by the backup target data in the second logical storage area. The first information processing apparatus further includes an evaluation index allocation processing part determining which one of the first and second data processing parts to use to process the backup target data according to an evaluation index prescribed as a data format of the backup target data, and a backup processing part, when performing backup processing of the backup target data, refers to the association relationship between the data format of the backup target data and any of the first and second data processing parts determined by the evaluation index allocation processing part, and causes the first or second data processing part is associated with the data format of the backup target data, to process the backup target data.

1 Claim, 23 Drawing Sheets

(56) References Cited

U.S. PATENT DOCUMENTS

| | | | |
|---|---|---|---|
| 2009/0100195 A1* | 4/2009 | Barsness et al. | 709/247 |
| 2009/0125577 A1* | 5/2009 | Kodama et al. | 709/201 |
| 2010/0332456 A1* | 12/2010 | Prahlad et al. | 707/664 |
| 2011/0218969 A1* | 9/2011 | Anglin et al. | 707/679 |
| 2011/0307657 A1* | 12/2011 | Timashev et al. | 711/112 |

OTHER PUBLICATIONS

PCT International Search Report and Written Opinion on application PCT/JP2011/007113 mailed Mar. 1, 2013; 14 pages.

* cited by examiner

COMPRESSION/DE-DUPLICATION
FUNCTION ID REGISTRATION TABLE — 1060

| BACKUP ID | COMPRESSION/ DE-DUPLICATION FUNCTION ID | STORAGE DESTINATION ID |
|---|---|---|
| 00 | A | C |
| 01 | B | A |
| 02 | C | B |
| 03 | D | D |
| ... | ... | ... |
| mn | ... | ... |

Fig. 7

TRANSFER MODE INFORMATION 1096

| TRANSFER MODE ID | TRANSFER MODE |
|---|---|
| 00 | COMPRESSION RATE |
| 01 | THROUGHPUT |

Fig. 8

FILE TYPE REGISTRATION INFORMATION TABLE 1070

| FILE TYPE ID 1071 | FILE TYPE 1072 |
|---|---|
| 01 | doc |
| 02 | xls |
| 03 | pdf |
| 04 | zip |
| 05 | OTHERS |

Fig. 9

EVALUATION RESULT TABLE 1080

1081

| FILE TYPE: doc | | |
|---|---|---|
| BACKUP ID | COMPRESSION RATE | THROUGHPUT |
| 00 | 40% | 110MB/s |
| 01 | 20% | 120MB/s |
| 02 | 35% | 115MB/s |
| 03 | 30% | 118MB/s... |
| ... | ... | ... |

EVALUATION INDEX TABLE 1085

10852

| | | BACKUP ID | | | | |
|---|---|---|---|---|---|---|
| | | 00 | 01 | 02 | ... | mn |
| FILE TYPE | doc | CR | TP | | | |
| | xls | | | | | |
| | pdf | | | | | |
| | zip | | | | | |
| | OTHERS | CR/TP | | | | |

BACKUP/RESTORE HISTORY INFORMATION TABLE 1090

| BACKUP/RESTORING TYPE (1091) | START TIME (1092) | END TIME (1093) | BACKUP SOURCE (RESTORING DESTINATION) INFORMATION (1094) | |
|---|---|---|---|---|
| | | | APPARATUS NUMBER (10941) | LOGIC DEVICE NUMBER (10942) |
| BACKUP | 00:05:00 | 02:00:00 | 001 | 001 |
| BACKUP | 03:00:00 | 04:10:00 | 002 | 001 |
| RESTORE | 15:00:00 | 16:00:00 | 001 | 001 |
| ... | ... | ... | ... | ... |

1095

| BACKUP DESTINATION (RESTORING SOURCE) INFORMATION | | | | | | |
|---|---|---|---|---|---|---|
| ADDITIONAL INFORMATION STORAGE DESTINATION | | | ... | ADDITIONAL INFORMATION STORAGE DESTINATION | | |
| APPARATUS NUMBER (10951) | LOGIC DEVICE NUMBER (10952) | ADDITIONAL INFORMATION STORAGE LOCATION INFORMATION (10953) | ... | APPARATUS NUMBER | LOGIC DEVICE NUMBER | ADDITIONAL INFORMATION STORAGE LOCATION INFORMATION |
| 003 | 001 | 0001 | ... | 003 | 002 | 0010 |
| 004 | 001 | 0001 | ... | 004 | 002 | 0100 |
| 003 | 001 | 0001 | ... | 003 | 002 | 0010 |
| ... | ... | ... | ... | ... | ... | ... |

UPGRADING OF STORAGE APPARATUS (BEFORE UPGRADING)

EVALUATION RESULT TABLE 1080

| doc FILE | | |
|---|---|---|
| BACKUP ID | COMPRESSION RATE | THROUGHPUT |
| 00 | 20% | 120MB/s |
| 01 | 40% | 110MB/s |
| 02 | 35% | 115MB/s |
| 03 | 30% | 118MB/s |
| ... | ... | ... |
| mn | 35% | 118MB/s |

EVALUATION INDEX TABLE 1085

| | | BACKUP ID | | | | | |
|---|---|---|---|---|---|---|---|
| | | 00 | 01 | 02 | 03 | ... | mn |
| FILE TYPE REGISTRATION INFORMATION | doc | TP | CR | | | | |
| | xls | | CR | TP | | | |
| | pdf | | TP | CR | | | |
| | zip | TP | | | CR | | |
| | ... | | | | | | |
| | OTHERS | CR/TP | | | | | |

UPGRADING OF STORAGE APPARATUS (AFTER UPGRADING)

EVALUATION RESULT TABLE 1080

| doc FILE | | |
|---|---|---|
| BACKUP ID | COMPRESSION RATE | THROUGHPUT |
| 00 | 20% | 120MB/s |
| 01 | 40% | 110MB/s |
| 02 | 35% | 115MB/s |
| 03 | 45% | 125MB/s |
| ... | ... | ... |
| mn | 35% | 118MB/s |

EVALUATION INDEX TABLE 1085

| | | BACKUP ID | | | | | |
|---|---|---|---|---|---|---|---|
| | | 00 | 01 | 02 | 03 | ... | mn |
| FILE TYPE REGISTRATION INFORMATION | doc | | | | CR/TP | | |
| | xls | | CR | TP | | | |
| | pdf | | TP | CR | | | |
| | zip | TP | | | CR | | |
| | ... | | | | | | |
| | OTHERS | CR/TP | | | | | |

ADDITION OF STORAGE APPARATUS (BEFORE ADDITION)

EVALUATION RESULT TABLE 1080

| doc FILE | | |
|---|---|---|
| BACKUP ID | COMPRESSION RATE | THROUGHPUT |
| 00 | 20% | 120MB/s |
| 01 | 40% | 110MB/s |
| 02 | 35% | 115MB/s |

EVALUATION INDEX TABLE 1085

| | | BACKUP ID | | |
| --- | --- | --- | --- | --- |
| | | 00 | 01 | 02 |
| FILE TYPE REGISTRATION INFORMATION | doc | TP | CR | |
| | xls | | CR | TP |
| | pdf | | TP | CR |
| | zip | TP | | |
| | ... | | | |
| | OTHERS | CR/TP | | |

ADDITION OF STORAGE APPARATUS (AFTER ADDITION)

EVALUATION RESULT TABLE 1080

| doc FILE | | |
|---|---|---|
| BACKUP ID | COMPRESSION RATE | THROUGHPUT |
| 00 | 20% | 120MB/s |
| 01 | 40% | 110MB/s |
| 02 | 35% | 115MB/s |
| 03 | 45% | 125MB/s |

EVALUATION INDEX TABLE 1085

| | | BACKUP ID | | | |
|---|---|---|---|---|---|
| | | 00 | 01 | 02 | 03 |
| FILE TYPE REGISTRATION INFORMATION | doc | | | | CR/TP |
| | xls | | CR | TP | |
| | pdf | | TP | CR | |
| | zip | TP | | | CR |
| | ... | | | | |
| | OTHERS | CR/TP | | | |

DISMANTLING OF STORAGE APPARATUS (BEFORE DISMANTLING)

EVALUATION RESULT TABLE 1080

| doc FILE | | |
|---|---|---|
| BACKUP ID | COMPRESSION RATE | THROUGHPUT |
| 00 | 20% | 120MB/s |
| 01 | 40% | 110MB/s |
| 02 | 35% | 115MB/s |
| 03 | 45% | 125MB/s |

EVALUATION INDEX TABLE 1085

| | | BACKUP ID | | | |
|---|---|---|---|---|---|
| | | 00 | 01 | 02 | 03 |
| FILE TYPE REGISTRATION INFORMATION | doc | | | | CR/TP |
| | xls | | CR | TP | |
| | pdf | | TP | CR | |
| | zip | TP | | | CR |
| | ... | | | | |
| | OTHERS | CR/TP | | | |

DISMANTLING OF STORAGE APPARATUS (AFTER DISMANTLING)

EVALUATION RESULT TABLE 1080

| doc FILE | | |
|---|---|---|
| BACKUP ID | COMPRESSION RATE | THROUGHPUT |
| 00 | 20% | 120MB/s |
| 01 | 40% | 110MB/s |
| 02 | 35% | 115MB/s |

EVALUATION INDEX TABLE 1085

| | | BACKUP ID | | |
|---|---|---|---|---|
| | | 00 | 01 | 02 |
| FILE TYPE REGISTRATION INFORMATION | doc | TP | CR | |
| | xls | | CR | TP |
| | pdf | | TP | CR |
| | zip | TP | | |
| | ... | | | |
| | OTHERS | CR/TP | | |

STORAGE SYSTEM AND METHOD FOR CONTROLLING STORAGE SYSTEM

TECHNICAL FIELD

The present invention relates to a storage apparatus and a storage apparatus control method.

BACKGROUND ART

A storage system generally includes a computer (hereinafter referred to as "server") such as a server computer executing data processing and a storage apparatus communicatively coupled to the server, and can store data processed by the server in the storage apparatus. Data processed by the server can be roughly classified into structured data stored into, for example, a database or the like, and other non-structured data. The non-structured data includes data of various types such as a document, an image, a sound, and the like.

In recent years, a remarkable increase in non-structured data stored in a storage system has brought strong demands for fast and efficient data backup processing of non-structured data. Also, in order to minimize storage resources consumed by backup data, the data backup processing are performed by using a de-duplication function for preventing redundant storage of same data and a data compression function for reducing the storage amount of data.

On the other hand, from the view point of effective utilization of hardware assets and software assets, it is already common practice to build one storage system including servers and storage apparatuses supplied by various vendors. In this case, different de-duplication functions and different data compression functions operate in different apparatuses within one storage system. The de-duplication functions and the data compression functions are implemented by a variety of software. However, it is known that de-duplication algorithms and data compression algorithms used in the variety of software makes the effects of these functions vary depending on the types of non-structured data. In the case of general data backup executed in a storage system, the association relationship between a server or storage apparatus serving as a backup source and a server or a storage apparatus serving as a backup destination of data sent from the server or storage apparatus of the backup source is determined in a fixed manner. In that case, unless modified by an administrator or the like, data to be backed up from a specific backup source to a backup destination is processed, irrespective of the type of data, by a specific de-duplication function and data compression function implemented in any apparatus in a backup processing path. Therefore, even though a specific de-duplication function and data compression function exhibit significant effects on a certain type of data and far less effects on other types of data, different types of data stored in a certain server or storage apparatus are automatically backed up by using the same de-duplication function and data compression function.

In view of such problems as described above, for example, PTL 1 discloses a backup system intended to perform a backup processing of backup target data appropriately for data properties of the backup target data in a method simple to users. The backup system includes a backup source computer which stores backup target data, a plurality of backup destination computers, each of which is coupled to the backup source computer via a network, backup mode selection means for selecting one backup mode from multiple backup modes prepared in advance, according to the data properties of backup target data, and backup execution means for causing the backup source computer to transfer backup target data to a backup destination computer selected from the backup destination computers on the basis of the selected backup mode, and causing the backup destination computer to store the data.

In addition, NPL 1 discloses a configuration in which de-duplication means of Avamar (trademark) is mounted in a backup server, and de-duplication means of Data Domain (trademark) is mounted in a backup storage coupled to the backup server. The backup server de-duplicates non-structured data by using the de-duplication means of Avamar, and de-duplicates structured data by using the de-duplication means of Data Domain.

CITATION LIST

Patent Literature

PTL 1: Japanese Patent Application Laid-open Publication No. 2005-92282

Non Patent Literature

NPL 1: EMC2, "AVAMAR, DUPLICATION BACKUP SOFTWARE AND SYSTEM," (online) (retrieved on Nov. 7, 2011) Internet <URL: http://www.emc.com/backup-and-recovery/avamar/avamar.htm>

SUMMARY OF INVENTION

Technical Problem

With use of the configuration disclosed in PTL 1, however, a backup system in which a backup source and a backup destination are equipped with respectively different de-duplication functions and data compression functions cannot be built by considering how to achieve a more efficient backup processing by using one of the de-duplication functions and one of the data compression functions whichever appropriate for a type of backup target data. According to NPL 1, the de-duplication means is selected on the basis of whether data is structured or non-structured. However, even though there are numerous types of non-structured data, the configuration is built without consideration of selection of appropriate de-duplication means on the basis of a type of non-structured data.

The present invention is provided to solve the above and other problems. An object of the present invention is to provide a storage system and a method for controlling the storage system, which are capable of achieving more efficient backup processing by appropriately using a different de-duplication function and data compression function depending on a type of backup target data.

Solution to Problem

For achieving the above and other purposes, one aspect of the present invention is a storage system which provides a data storage area to an external apparatus. The storage system includes, at least, a first information processing apparatus including a first logical storage area forming the data storage area, and a first data processing part configured to perform processing to reduce the storage capacity used by a backup target data in the first logical storage area, and a second information processing apparatus communicatively coupled to the first information processing apparatus and including a second logical storage area forming the data storage area, and a second data processing part configured to perform processing to reduce the storage capacity used by a backup target data in the second logical storage area. The first information processing apparatus further includes an evaluation index allocation processing part configured to determine which one of the first data processing part and the second data processing part to use to process a backup target data according to an evaluation index prescribed as a data format of the backup target data, and a backup processing part configured to, when performing backup processing of the backup target data, refer to an association relationship between the data format of the backup target data and any of the first and second data processing parts determined by the evaluation index allocation processing part, and cause the backup target data to be processed by using the first or second data processing part associated with the data format of the backup target data.

Another aspect of the present invention is a method for controlling a storage system which provides a data storage area to an external apparatus. The storage system includes, at least, a first information processing apparatus including a first logical storage area forming the data storage area, and a first data processing part configured to perform processing to reduce the storage capacity used by a backup target data in the first logical storage area, and a second information processing apparatus communicatively coupled to the first information processing apparatus and including a second logical storage area forming the data storage area, and a second data processing part configured to perform processing to reduce the storage capacity used by a backup target data in the second logical storage area. In this method, the first information processing apparatus determines which one of the first data processing part and the second data processing part to use to process a backup target data according to an evaluation index prescribed as a data format of the backup target data, and causes the first or second data processing part. When performing backup processing of the backup target data, the first information processing apparatus refers to an association relationship between the data format of the backup target data and any of the first and second data processing parts determined by the evaluation index allocation processing part, and causes the backup target data to be processed by using the first or second data processing part associated with the data format of the backup target data.

Advantageous Effects of Invention

The present invention provides a storage system and a method for controlling the storage system, which are capable of achieving more efficient backup processing by appropriately using one of different de-duplication functions or data compression functions depending on the type of a backup target data.

BRIEF DESCRIPTION OF DRAWINGS

FIG. 7 is a diagram showing a configuration example of transfer mode information 1096.
FIG. 8 is a diagram showing a configuration example of a file type registration information table 1070.
FIG. 9 is a diagram showing a configuration example of an evaluation result table 1080.
FIG. 10 is a diagram showing a configuration example of an evaluation index table 1085.
FIG. 11 is a diagram showing a configuration example of a backup/restoring history information table 1090.

DESCRIPTION OF EMBODIMENTS

EXAMPLE 1

Figure 1:
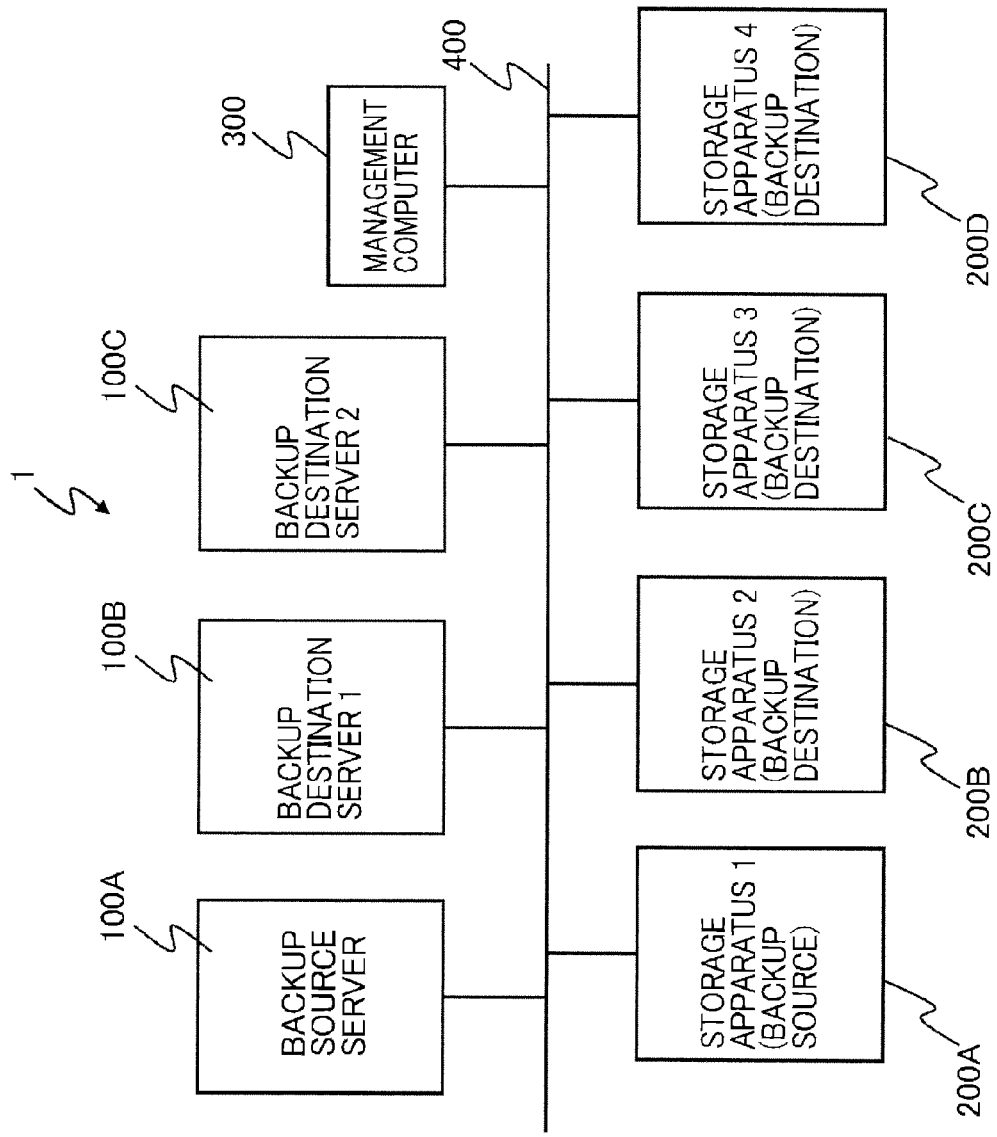
FIG. 1 is a diagram schematically showing a configuration example of a storage system 1 according to one embodiment of the present invention.

Hereinafter, embodiments of the present invention are described with reference to the accompanying drawings. Throughout all drawings, description of same configurations is omitted by denoting with same reference numerals.

Configuration of Storage System 1

First, a configuration of a storage system 1 according to one embodiment of the present invention is described. FIG. 1 shows a configuration example of a storage system 1 according to the embodiment of the present invention.

The storage system 1 includes server apparatuses (hereinafter referred to as "servers") 100A to 100C, storage apparatuses 200A to 200D, a management computer 300, and a communication network 400. The servers 100A to 100C, the storage apparatuses 200A to 200D and the management computer 300 are communicatively coupled to each other via the communication network. The servers 100A to 100C illustrated in FIG. 1 are file servers configured to provide a read object data on a per-file basis in response to a data read request from a client apparatus (hereafter referred to as "client") which is, for example, an external apparatus (not shown). Configuration of the servers 100A to 100C is substantially the same to each other. Hereinafter, those servers are referred to as the server 100 unless specifically distinguished among the servers 100A to 100C. An example of a basic configuration of the server 100 is described later.

The storage apparatuses 200A to 200D provide the servers 100A to 100C with storage areas for storing data processed by the servers 100A to 100C. Similarly with the servers 100A to 100C, the storage apparatuses have a configuration of NAS (Network Attached Storage) configured to perform data input/output on a per-file basis. Configuration of the storage apparatuses 200A to 200D is substantially the same to each other. Hereinafter, those apparatuses are referred to as the storage apparatus 200 unless specifically distinguished among the storage apparatuses 200A to 200D. In a configuration of this embodiment illustrated in FIG. 1, a basic configuration of the storage apparatus 200 is the same as the server 100. A configuration example thereof is described later.

The management computer 300 is provided with a function which gives operation inputs for various settings of the servers 100A to 100C and the storage apparatuses 200A to 200D and operation inputs for the backup processing, receives output of operation results from the servers 100A to 100C and the storage apparatuses 200A to 200D, and displays the output.

The communication network 400 is a communication line enabling mutual data communication among the servers 100A to 100C, the storage apparatuses 200A to 200D and the management computer 300, and can be configured, for example, as a LAN (Local Area Network) in which communication by the Internet protocol is performed. Configuration of the communication network 400 is not limited to LAN.

In the storage system 1 illustrated in FIG. 1, out of the servers 100A to 100C, the server 100A is set as a backup source of data subjected to the backup processing, and the servers 100B and 100C are set as backup destinations of data subjected to the backup processing. Out of the storage apparatuses 200A to 200D, the storage apparatus 200A is designated as a backup source, and the storage apparatuses 200B to 200D are designated as backup destinations. However, a server 100 or a storage apparatus 200 to be set as a backup destination or a backup source can be determined appropriately based on requirements in terms of the system management, or the like. Further, any one of the storage apparatuses 200A to 200D can be set as an additional storage drive externally coupled to the other storage apparatus 200. The backup processing according to this embodiment is described later.

Hardware Configuration of Server 100 and Storage Apparatus 200

Figure 2:
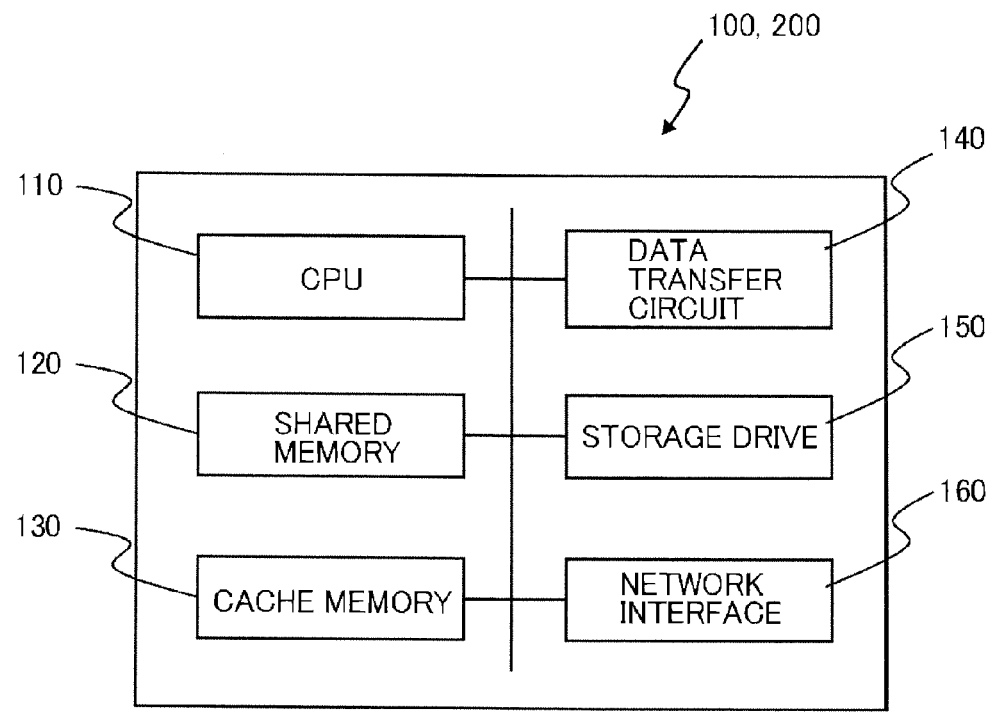
FIG. 2 is a diagram showing a hardware configuration example of a server apparatus 100 and a storage apparatus 200 included in the storage system 1.

Next, a hardware configuration of the server 100 and the storage apparatus 200 included in the storage system 1 of FIG. 1 is described. FIG. 2 shows a hardware configuration example of the server 100 and the storage apparatus 200. As described above, in the storage system 1 according to this embodiment, the server 100 and the storage apparatus 200 have a substantially the same configuration. Therefore, the server 100 is described here.

The server 100 according to this embodiment comprises a processor 110, a shared memory 120, a cache memory 130, a data transfer circuit 140, a storage drive 150, and a network interface 160. The processor 110 is a device configured to execute various programs for achieving functions such as backup processing described later and is configured, for example, as a CPU (Central Processing Unit) or an MPU (MicroProcessor Unit). Hereinafter, the device is referred to as "CPU".

The shared memory 120 is a memory for storing various programs to achieve functions such as backup processing described later, parameters used in the course of execution of a program and data such as various tables, and includes memory elements such as a ROM (Read Only Memory), a RAM (Random Access Memory), a flash memory, and the like. The cache memory 130 is a storage area for temporarily storing data written into and read from the storage drive 150 described later, and includes memory elements, for example, such as a RAM and the like.

The data transfer circuit 140 executes, under management of the CPU 110, data transfer between the storage drive 150 and the cache memory 130 and between the cache memory 130 and the network interface 160 described later. The storage drive 150 is a storage device for creating a storage area which the server 100 provides to an external client, and may be configured by an appropriate storage device including a hard disk drive (HDD), a solid state drive (SSD), or the like.

The network interface 160 has a function of interfacing between the communication network 400 and an internal network in the server 100. When the communication network 400 is configured as a LAN like this embodiment, an NIC (Network Interface Card) is used as the network interface 160.

Hardware Configuration of Management Computer 300

Figure 3:
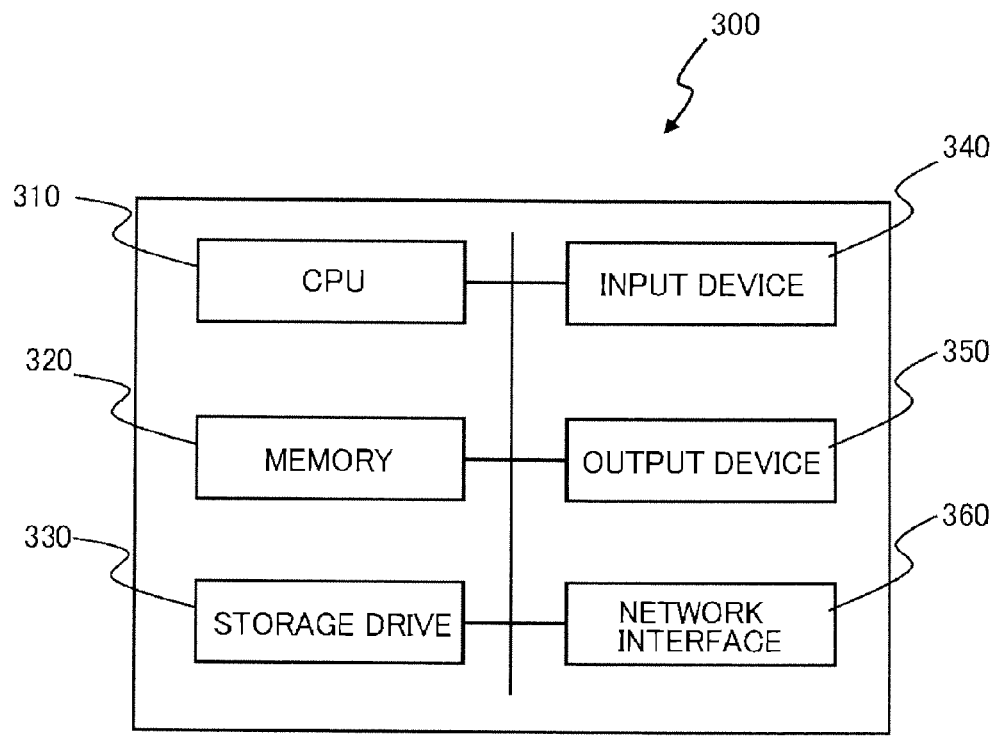
FIG. 3 is a diagram showing a hardware configuration example of a management computer 300 included in the storage system 1.

Next, hardware configuration of the management computer 300 is described. FIG. 3 shows a hardware configuration example of the management computer 300 in the storage system 1 according to this embodiment. As illustrated in FIG. 3, the management computer 300 includes, a CPU 310, a memory 320, a storage drive 330, an input device 340, an output device 350 and a network interface 360.

The CPU 310 is similar to the CPU 110 of the server 100 and may be a CPU or any other calculation device such as an MPU. The memory 320 is a memory for storing various programs for achieving functions as the management computer 300, parameters used during execution of a program, and data such as various tables, and includes memory elements such as a ROM (Read Only Memory), a RAM (Random Access Memory), a flash memory, and the like. The storage drive 330 is an auxiliary storage apparatus including a storage device similar with the storage drive 150 of the server 100, and may be configured by appropriate storage devices including, an HDD, an SSD, and the like.

The input device 340 is a data input device used in a personal computer, and may include an appropriate input device selected from, for example, a keyboard, a mouse, a touch screen, a pen tablet, and the like. The output device 350 is a data output device used in a personal computer, and may include an appropriate output device, for example, such as a display monitor, a printer, and the like. The network interface 360 is an interface circuit, for example, such as a NIC and the like, similarly with the network interface 160 of the server 100.

Software Configuration of Server 100 and Storage Apparatus 200

Figure 4:
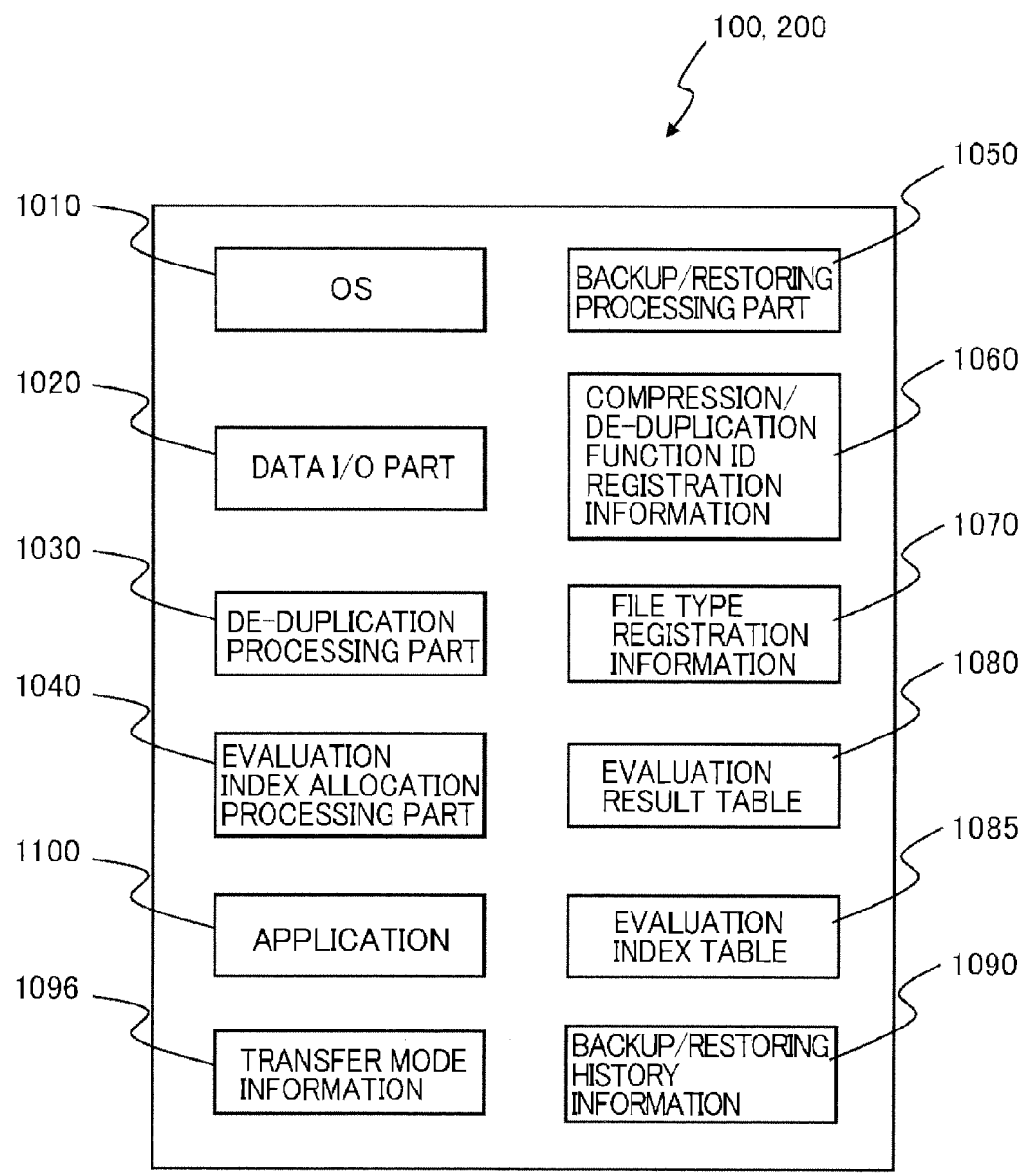
FIG. 4 is a diagram showing a software configuration example of the server apparatus 100 and the storage apparatus 200.

Next, software configuration of the server 100 and the storage apparatus 200 is described. FIG. 4 shows a software configuration example of the server 100 and the storage apparatus 200. As described on the hardware configuration, the server 100 and the storage apparatus 200 have software configurations similar to each other.

The server 100 illustrated in FIG. 4 includes an operating system (OS) 1010, a data I/O part 1020, a de-duplication processing part 1030, an evaluation index allocation processing part 100, a backup/restoring processing part 1050, a compression/de-duplication function ID registration information table 1060, a file type registration information table 1070, an evaluation index table 1080, an evaluation result table 1090, a backup/restoring history information table 1090, and an application 1100. Functions of the OS 1010, the data I/O part 1020, the de-duplication processing part 1030, the evaluation index allocation processing part 100, the backup/restoring processing part 1050, and the application 1100 are achieved when the CPU 110 executes programs for respective functions read into, for example, the shared memory 120 of FIG. 2. The compression/de-duplication function ID registration information table 1060, the file type registration information table 1070, the evaluation result table 1080, the evaluation index table 1085 and the backup/restoring history information table 1090 store data used by the programs and are similarly stored in the shared memory 120.

The OS 1010 is a basic software serving as an execution base of programs executed by the server 100 and may be used by selecting out of various OSs commonly used as a computer's OS. Since the server 100 according to this embodiment performs data management on a per-file basis in the server 100, the OS 1010 includes a file system of an appropriate format. The data I/O part 1020 is a program which manages, under control of the OS 1010, data input/output (data I/O) to programs running in the server 100.

The de-duplication processing part 1030 executes, when performing the backup processing of data stored in the storage drive 150, de-duplication processing which enhances effective utilization of a storage resource by preventing waste of the storage area. There are various types of the de-duplication processing, but any type may be adopted appropriately. For example, the de-duplication mode may be any mode of fixed-length block basis and variable-length block basis. Further, the de-duplication mode includes various vender-specific modes provided by storage venders and the like. According to this embodiment, a data compression function reducing the size of the backup target data is also implemented in conjunction with the de-duplication processing. However, provision of the data compression function to the de-duplication processing part 1030 is not essential. Further, a configuration in which data compression function is provided in place of the de-duplication processing can be adopted. In such cases, the data compression function of any type may be adopted.

In order to determine which de-duplication processing part 1030 provided in the storage system 1 to use to achieve most efficient utilization of the storage resource in processing backup target data, the evaluation index allocation processing part 1040 classifies backup target data by data type to evaluate effects of the de-duplication function for each data type. This embodiment uses, as evaluation indices for classifying data, extensions of data files (txt indicating data in the text format, jpg indicating image data in the JPEG (Joint Photographic Experts group) type, or the like), but other evaluation indices may be set.

The backup/restoring processing part 1050 executes, for example, processing of backing up data stored in a predetermined server 100 or a storage apparatus 200 into another server 100 or storage apparatus 200 in response to a process start command from the management computer 300, and processing of restoring the backed up data from a server 100 or a storage apparatus 200 of the backup destination to a server 100 or a storage apparatus 200 of the backup source. In the backup processing, de-duplication or data compression processing is executed by using a de-duplication processing part 1030 provided in the server 100 or the storage apparatus 200 of the backup source or the backup destination determined by the method according to this embodiment described later. In the restoring processing, data is restored to a server 100 or a storage apparatus 200 of the backup source by using a de-duplication processing part 1030 used in the backup processing.

The application 100 is implemented in, for example, the server 100, and has a function of performing various processing of data received from an external apparatus such as the client, the management computer 300, and the like. Not only on the server 100 but also the storage apparatus 200, a variety of applications may be implemented as appropriate. Some of the servers 100 and the storage apparatuses 200 provided in the storage system 1 may have a configuration not including the de-duplication processing part 1030 and the backup/restoring processing part 1050.

Figures 5, 6:
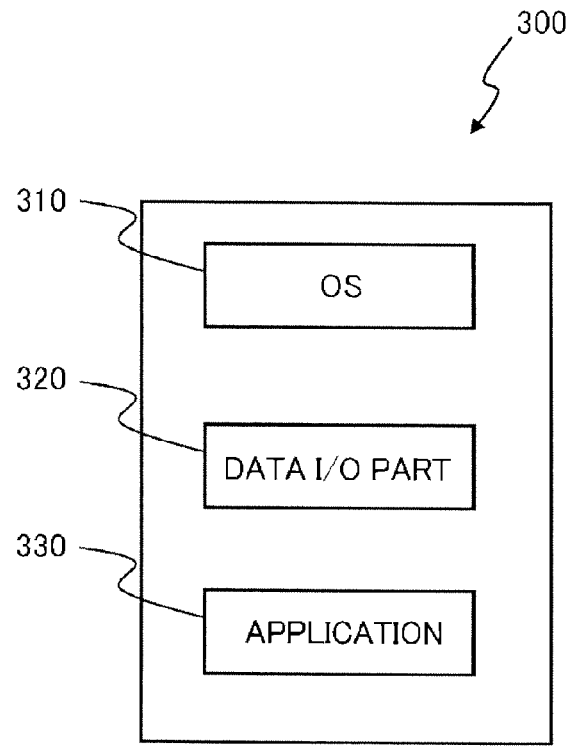
FIG. 5 is a diagram showing a software configuration example of the management computer 300.
FIG. 6 is a diagram showing a configuration example of a compression/de-duplication function ID registration table 1060.

Next, tables which are set to a server 100 or a storage apparatus 200 are described. First, the compression/de-duplication function ID registration information table 1060 is described. FIG. 6 shows a configuration example of the compression/de-duplication function ID registration information table 1060. The compression/de-duplication function ID registration table 1060 is a table in which backup processing executed in the storage system 1 is identified by using a compression/de-duplication function used in the backup processing and a storage destination of its backup target data.

As illustrated in FIG. 6, the compression/de-duplication function ID 1062 and the storage destination ID 1063 are recorded in the compression/de-duplication function ID registration table 1060. The backup ID 1061 is an identifier assigned to identify backup processing executed in the storage system 1. The compression/de-duplication function ID 1062 is an identifier assigned such that respective compression/de-duplication functions provided in a server 100 or a storage apparatus 200 can be identified with each other. In backup processing identified with the backup ID 1061, de-duplication processing or data compression processing is executed by a de-duplication processing part 1030 identified with the compression/de-duplication function ID 1062 associated with the backup ID 1061. The storage destination ID 1063 is an identifier assigned such that a backup destination of the server 100 or the storage apparatus 200 in which backup target data is stored can be identified with each other when backup processing identified with an associated backup ID 1061 is executed. An example of FIG. 6 shows that in the backup processing of the backup ID 1061 identified with 00, a compression/de-duplication function A is used, and backup target data is stored in a storage destination of the storage destination ID 1063 identified with C. The compression/de-duplication function ID registration table 1060 may be preset to the shared memory 120 or the storage drive 150 of the server 100 or the storage apparatus 200 before starting operation of the storage system 1.

Next, the transfer mode information 1096 is described. FIG. 7 shows a configuration example of the transfer mode information 1096. The transfer mode information 1096 prescribes the type of backup processing performed in the storage system 1: that is, whether the backup processing is performed by prioritizing the data compression rate with the importance attached to efficient utilization of storage resources or by prioritizing the throughput with the importance attached to I/O performance as the storage system 1. An example of FIG. 7 shows that when the transfer mode ID is 00, the backup processing is performed by prioritizing the data compression rate, and when the transfer mode ID is 01, the backup processing is performed by prioritizing the throughput. The backup processing performed by taking the transfer mode type into account is described later.

Next, the file type registration information table 1070 is described. FIG. 8 shows a configuration example of the file type registration information table 1070. The file type registration information table 1070 is a table to which the evaluation index allocation processing part 1040 refers when classifying the backup target data by data type. In an example of FIG. 8, the file type registration information table 1070 records a file type ID 1071 and a file type 1072. The file type ID 1071 is an identifier assigned to each file type described later. The file type 1072 is a file type associated with an associated file type ID 1071 by using an extension indicating the file format. In the example of FIG. 8, the file type 1072 having the file type ID 1071 is associated with the extension "doc." Further, a backup target data not classified by a specific file type is classified as "others" and is associated with 05 as the file type ID 1071.

Next, the evaluation result table 1080 is described. FIG. 9 shows a configuration example of the evaluation result table 1080. The evaluation result table 1080 is a table which contains quantitative records indicating how a compression/de-duplication function provided in the storage system 1 exhibits an effect, per data format (or per file type according to this embodiment) of a data subjected to the backup processing in the storage system 1. Based on the evaluation result table 1080, a compression/de-duplication function providing a higher compression/de-duplication effect can be used according to the file type of the backup target data.

In the example shown in FIG. 9, the evaluation result table 1080 records a file type 1081, a compression/de-duplication function ID 1082, a compression rate 1083 and a throughput 1084. The file type 1081 is the same as the file type 1072 of the file type registration information table 1070, indicating the file type of backup target data. The compression/de-duplication function ID 1082 is an identifier assigned to identify a compression/de-duplication function which is applied to the backup target data in the backup processing, and is associated with the backup ID 1061 of the compression/de-duplication function ID registration table 1060. The compression rate 1083 records a data compression rate obtained when a backup target data classified into the file type 1081 is processed by a compression/de-duplication function identified with the associated backup ID 1082. In this case, the data compression rate is a value obtained by dividing a storage capacity occupied by the backed-up data in a backup destination by a storage capacity occupied by backup target data in a backup source. The throughput 1084 records a throughput obtained when a backup target data classified into the file type 1081 is processed by a compression/de-duplication function identified with the associated backup ID 1082. The throughput is a value obtained by dividing a storage capacity occupied by a backup target data in a backup source by a time taken from the start to the end of the backup processing.

Next, the evaluation index table 1085 is described. FIG. 10 shows a configuration example of the evaluation index table 1085. The evaluation index table 1085 is a table which records which compression/de-duplication function provided in the storage system 1 is used for backup processing per the file type of the backup target data. In an example of FIG. 10, the evaluation index 1085 records a file type 10851 and a backup ID 10852 in association with each other, in which the backup ID designated to be used for a file type based on evaluation results recorded in the evaluation result table 1080 is associated. In the example of FIG. 10, when the file type 10851 of backup target data is "doe" and the data compression rate is prioritized, a compression/de-duplication function identified with a backup ID 10852 of 00 is used. In FIG. 10, this relationship is recorded with a sign CR (Compression) placed in a cell where the fields "doc" and 00 cross over in a matrix of the file type 10851 and the backup ID 10852. On the other hand, when the file type 10851 of the backup target data is "doc" and the throughput is prioritized, a compression/de-duplication function identified with a backup ID 10852 of 01 is used. In FIG. 10, this relationship is recorded with a sign TP (Throughput) placed in a cell where the fields "doc" and 01 cross over in the matrix of the file type 10851 and the backup ID 10852. Data not classified into a specific file type 10851 is automatically processed by a compression/de-duplication function identified with a backup ID 10852 of 00.

Next, the backup/restoring history information table 1090 is described. FIG. 11 shows a configuration example of the backup/restoring history information table 1090. The backup/restoring history information table 1090 is a table which records information related to backup processing or restoring processing executed in the storage system 1. In the example of FIG. 11, the backup/restoring history information table 1090 records a backup/restoring type 1091, a start time 1092, an end time 1093, backup source (restoring destination) information 1094 and backup destination (restoring source) information 1095.

The backup/restoring type 1091 records which of backup processing or restoring processing is executed in the storage system 1 in a manner identifiable with backup or restoring. The start time 1092 and the end time 1093 respectively record a start time and an end time of processing identified with an associated backup/restoring type 1091. The backup source (restoring destination) information 1094 records information of a backup source in the backup processing and a restoring destination in the restoring processing, and each information contains an apparatus number 10941 and a logical device number 10942. The apparatus number 10941 records an identifier which identifies, in a manner identifiable in the storage system 1, an apparatus serving as a backup source or a restoring destination, that is, the server 100 or the storage apparatus 200. The logical device number 10942 records an identifier which identifies, in an identifiable manner, a logical device serving as a backup source (restoring destination) in an associated apparatus number 10941. Here, the logical device represents a logical storage area organized by an appropriate RAID (Redundant Array of Inexpensive (or Independent) Disks) controller from a physical storage area provided by a storage drive 150 in an associated server 100 or storage apparatus 200. According to this embodiment, a function of the RAID controller is included in the data I/O part 1020 provided in the server 100 or the storage apparatus 200. The respective servers 100 or storage apparatuses 200 may include a plurality of logical devices by further dividing the logical device. The backup processing in the storage system 1 is executed on the basis of this logical device. The backup destination (restoring source) information 1095 records information of the backup destination in the backup processing or information of the restoring source in the restoring processing, and the information further includes an apparatus number 10951, a logical device number 10952 and additional information storage location information 10953. The apparatus number 10951 and the logical device number 10952 are the same as the apparatus number 10941 and the logical device number 10942 respectively. The additional information storage location information 10953 records a logical address in a logical device which stores additional information generated by a de-duplication processing part 1030 used in backup processing when the backup processing is executed regarding the logical device of a backup source.

Figure 12:
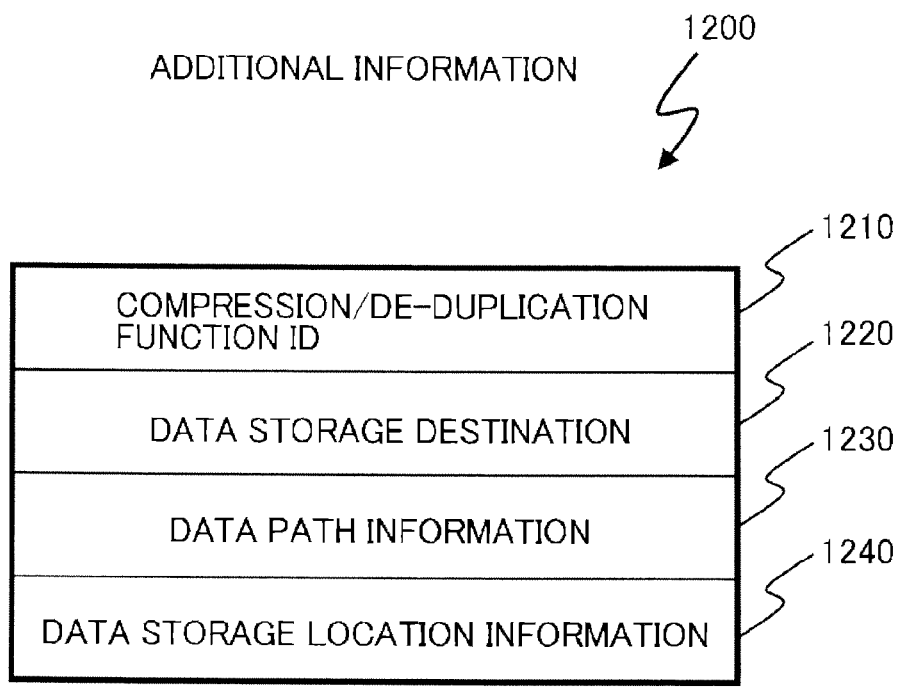
FIG. 12 is a diagram showing a configuration example of additional information 1200.

A configuration example of the additional information 1200 is shown in FIG. 12. The additional information 1200 is information generated by a de-duplication processing part 1030 used to perform a compression/de-duplication function in the backup processing. In the example of FIG. 12, a compression/de-duplication function ID 1210, a data storage destination 1220, data path information 1230 and data storage location information 1240 are recorded. The compression/de-duplication function ID 1210 is an identifier for identifying a compression/de-duplication function used in the backup processing. The data storage destination 1220 records an identifier which identifies a server 100 or a storage server 200 in which data is stored in the backup processing. The data path information 1230 is path information indicating the backup source, and in which path information of a file subjected to the backup processing and identified with a file name XXX, for example, in a format like "C:\root\files\XXX" is recorded. The data storage location information 1240 records a logical address which is a storage location in a logical device of the data storage destination 1220 for data forming a file identified with the data path information 1230. The additional information 1220 is, as well, information indicating that compression/de-duplication processing has been executed by any one of compression/de-duplication functions in associated backup processing. In this regard, specific examples of the backup processing are described later.

Software Configuration of Management Computer 300

Next, a software configuration of the management computer 300 is described. FIG. 5 shows a configuration example of the management computer 300. In the example of FIG. 5, the management computer 300 includes an OS 310, a data I/O part 320 and an application 330.

The OS 310 is a basic software serving as an execution base of programs executed by the management computer 300 and may be used by selecting out of various OSs commonly used as a computer's OS. The data I/O part 320 is a program which manages, under control by the OS 310, data input/output (data I/O) to programs running in the management computer 300.

The application 330 contains programs for executing, as the management computer 300, an operation command to a server 100 or a storage apparatus 200, output processing of operation status information from a server 100 or a storage apparatus 200, and the like. The programs include, for example, a browser for data input/output to and from a server 100 or a storage apparatus 200 via the communication network 400.

Backup Processing in Storage System 1

Figure 13:
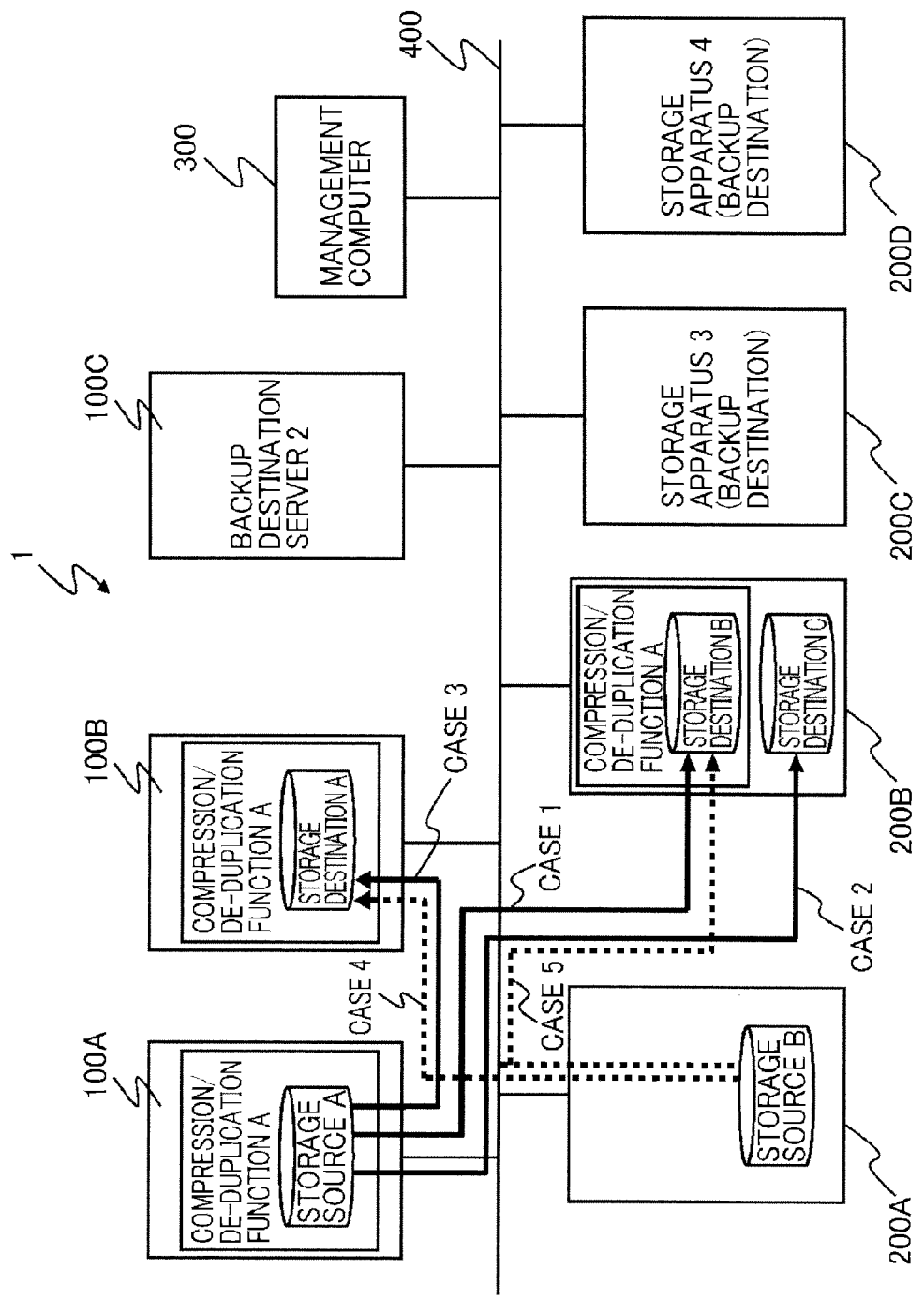
FIG. 13 is a diagram schematically showing a mode of the backup processing executed in the storage system 1.

Next, backup processing executed in the storage system 1 according to this embodiment is described. FIG. 13 schematically shows types of the backup processing executed in the storage system 1. FIG. 13 is equivalent to a schematic configuration diagram of the storage system 1 shown in FIG. 1, and shows a visualized flow of backup target data in the backup processing in the storage apparatus 1.

In FIG. 13, backup target data is stored in a server 100A or a storage apparatus 200A, which is a backup source, and the backup target data is assumed to be processed according to one of the five processing types of Cases 1 to 5. Backup destination of the backup target data is a server 100B or a storage apparatus 200B. In the storage apparatus 200B, a specific storage destination of the data is divided into storage destinations B and C, each of which is a logical device set depending on existence/non-existence of the compression/de-duplication processing of the backup target data.

In the backup processing types of Cases 1 to 5 illustrated in FIG. 13, there is a following relationship between a logical device which is a storage source and a storage destination of the backup target data and a compression/de-duplication function implemented in the storage source and the storage destination. A compression/de-duplication function A is implemented in a server 100A, a compression/de-duplication function B in a server 100B, and a compression/de-duplication function C in a storage apparatus 200B, respectively.

|  | Case 1 | Case 2 | Case 3 | Case 4 | Case 5 |
| --- | --- | --- | --- | --- | --- |
| Backup Source | Backup Source A (Server 100A) | Backup Source A (Server 100A) | Storage Source A (Server 100A) | Storage Source B (Storage Apparatus 200A) | Storage Source B (Storage Apparatus 200A) |
| Backup Destination | Backup Destination B (Storage Apparatus 200B) | Backup Destination C (Storage Apparatus 200B) | Storage Destination A (Server 100B) | Storage Destination A (Server 100B) | Storage Destination B (Storage Apparatus 200B) |
| Compression/De-duplication Function | Compression/De-duplication Function C | Compression/De-duplication Function A | Compression/De-duplication Function B | Compression/De-duplication Function B | Compression/De-duplication Function C |

As shown in the backup processing types described above, application of any one of the compression/de-duplication functions provided in the storage system 1 and application of any one of the compression/de-duplication functions in respective backup processing are determined depending on the data format (file type) of the backup target data. In any case, two or more compression/de-duplication functions are not used in duplicate in a same backup processing. Such a duplicate use of compression/de-duplication functions is prevented by the use of the compression/de-duplication function ID registration table 1060 in FIG. 6. For example, as shown in Case 1 and Case 2 in FIG. 13, when the compression/de-duplication function A is to be used, the storage destination C is defined like in Case 2, and when the compression/de-duplication function C is to be used, the storage destination B is defined like in Case 1. Accordingly, the duplicate use of the compression/de-duplication functions A and C is prevented.

Description of Data Processing in Storage System 1

Next, data processing executed in the storage system 1 of the above configurations is described.

Evaluation Index Registration Processing

Figure 14:
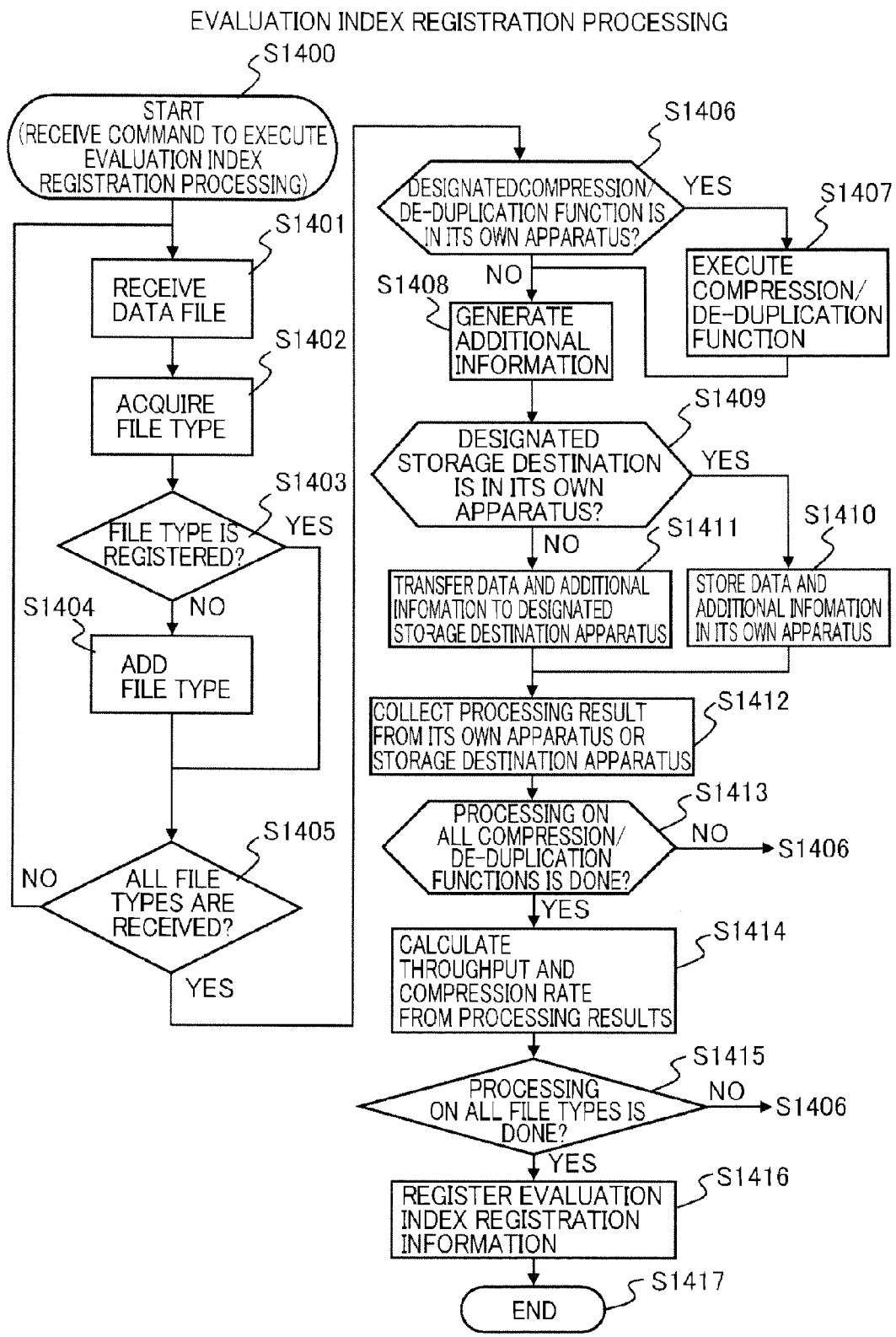
FIG. 14 is a flowchart showing an example of an evaluation index registration processing flow.

First, the evaluation index registration processing is described. FIG. 14 shows an example of the evaluation index registration processing flow executed in the storage system 1 according to this embodiment. The evaluation index registration processing is processing executed as preparatory processing before starting backup processing of data stored in a server 100 or a storage apparatus 200 in the storage system 1. In the evaluation index registration processing, a relationship between the file type of the backup target data and the performance of the compression/de-duplication function in processing a data of the file type is checked for each logical device in which backup target data is stored, and an evaluation index for determining a file type of the backup target data and a compression/de-duplication function which should process the file type is created.

First, upon receiving a command to execute the evaluation index registration processing from the management computer 300, the evaluation index allocation processing part 1040 receives a data file from a logical device of the backup source (for example, a storage source A of the server 100A) contained in the execution command as a target, and acquires a file type thereof (S1400 to S1402). The evaluation index allocation processing part 1040 determines, by referring to the file type registration information table 1070, whether or not the acquired file type is registered in the file type registration information table 1070 (S1403). If it is determined that the file type is not registered (S1403, No), the evaluation index allocation processing part 1040 adds the acquired file type to the file type registration information table 1070 and causes the processing to shift to S1405 (S1404). If it is determined that the acquired file type is registered in the file type registration information table 1070 (S1403, Yes), the evaluation index allocation processing part 1040 determines whether or not all data files have been received from a logical device of the backup source (S1405), and if it is determined that the data files have been received (S1405, Yes), causes the processing to shift to S1406. If it is determined that all data files have not been received from the logical device of the backup source (S1405, No), the evaluation index allocation processing part 1040 causes the processing to return to S1401 and receives data not yet received.

Next, the evaluation index allocation processing part 1040 determines, by referring to the compression/de-duplication function ID registration table 1060, whether or not a compression/de-duplication function ID 1062 registered with a backup ID 1061 as "00" exists in the receiving sever or the storage apparatus itself (S1406), and if it is determined that the compression/de-duplication function ID 1062 exists therein (S1406, Yes), executes the compression/de-duplication processing by the compression/de-duplication function (S1407) and causes the processing to shift to S1408. If it is determined that the compression/de-duplication function ID 1062 does not exist in the server or the storage apparatus thereof (S1406, No), the evaluation index allocation processing part 1040 generates additional information of FIG. 12 for data file being processed and attaches to the data file (S1408). If the additional information is attached to the backup target data, the server 100 or the storage apparatus 200 with the software of the present embodiment implemented refers to the compression/de-duplication ID 1210 in the additional information 1200 and determines whether or not the compression/de-duplication function of the own apparatus is to be executed. In the server 100 or the storage apparatus 200 without the software of the present embodiment, whether or not the compression/de-duplication function of the own apparatus is to be executed is determined according to the condition defined when the compression/de-duplication function ID registration table 1060 is set, that is the logical device as the storage destination to which the compression/de-duplication function is to be executed.

Next, the evaluation index allocation processing part 1040 determines whether or not a storage destination ID 1063 associated with the compression/de-duplication function ID 1062 being processed in a compression/de-duplication function ID registration table 1060 referred to at S1406 exists in the own server or the storage apparatus (S1409). If it is determined that the storage destination ID 1063 exists therein (S1409, Yes), the evaluation index allocation processing part 1040 stores the additional information and the data file to be processed into a storage destination logical device in the own server or the storage apparatus (S1410). If it is determined that the storage destination ID 1063 associated with the compression/de-duplication function ID 1062 being processed does not exist therein (S1409, No), the evaluation index allocation processing part 1040 transfers the additional information and the data file to be processed to a server 100 or a storage apparatus 200 in which the storage destination ID 1063 associated with the compression/de-duplication function ID 1062 being processed is provided (S1411).

Next, the evaluation index allocation processing part 1040 collects processing results related to the data file to be processed from the server or the own storage apparatus or any other server 100 or storage apparatus 200 in which the data file is stored (S1412). According to this embodiment, the processing results are the size of the target data file in the storage destination and a time taken from the start to the end of the processing. The start time and the end time of the processing can be acquired from records in the backup/restoring history information table 1090 of FIG. 11. Further, the processing results from a storage destination apparatus other than the own server or the storage apparatus can be acquired by a monitoring means such as, for example, SNMP (Small Network Monitoring Protocol) or the like.

Next, the evaluation index allocation processing part 1040 determines whether or not collection of processing results in S1412 has completed for all compression/de-duplication functions ID 1062 registered in the compression/de-duplication function ID registration table 1060 (S1413), and if it is determined that collection of the processing results has been completed (S1413, Yes), the evaluation index allocation processing part 1040 causes the processing to shift to S1414. If it is determined that collection of the processing results has not been completed (S1413, No), the evaluation index allocation processing part 1040 returns the processing to S1406 and then repeats subsequent processing of compression/de-duplication functions registered in the compression/de-duplication function ID registration table 1060.

Next, the evaluation index allocation processing part 1040 calculates, from the processing results collected at S1412, a throughput and a compression rate which can be obtained by the compression/de-duplication functions registered in the compression/de-duplication function ID registration table 1060 (S1414). The throughput is a value obtained by dividing an original size of the target data file by a time taken from the start to the end of the processing. The compression rate is a value obtained by dividing a size of the data file in the storage destination by a size thereof in the storage source. The calculated throughput and compression rate are stored in the evaluation result table 1080 by associating with the file type 1081 and the backup ID 1082 respectively.

Next, the evaluation index allocation processing part 1040 determines whether or not the evaluation index registration processing has been performed on all file types registered in the file type registration information table 1070 (S1415), and if it is determined that the evaluation index registration processing has been performed for all file types (S1415, Yes), the evaluation index allocation processing part 1040 records, on the basis of records in the evaluation result table 1080, the backup ID 10852 including a compression/de-duplication function used for an applicable file type 10851 in the evaluation index table 1085 per index of the throughput prioritizing the performance and per index of the compression rate prioritizing the resource efficiency, and ends the processing (S1416, S1417). If it is determined that the evaluation index registration processing has not been performed for all file types (S1415, No), the evaluation index allocation processing part 1040 repeats the processing from S1406 for all unprocessed file types registered in the file type registration information table 1070.

According to the evaluation index registration processing described above, an optimum compression/de-duplication function appropriate for performance and capacity efficiency requirements of the storage system 1 can be selected per file type of the backup target data.

Evaluation Index Registration Processing in Lower-Level Apparatus

Figure 15A:
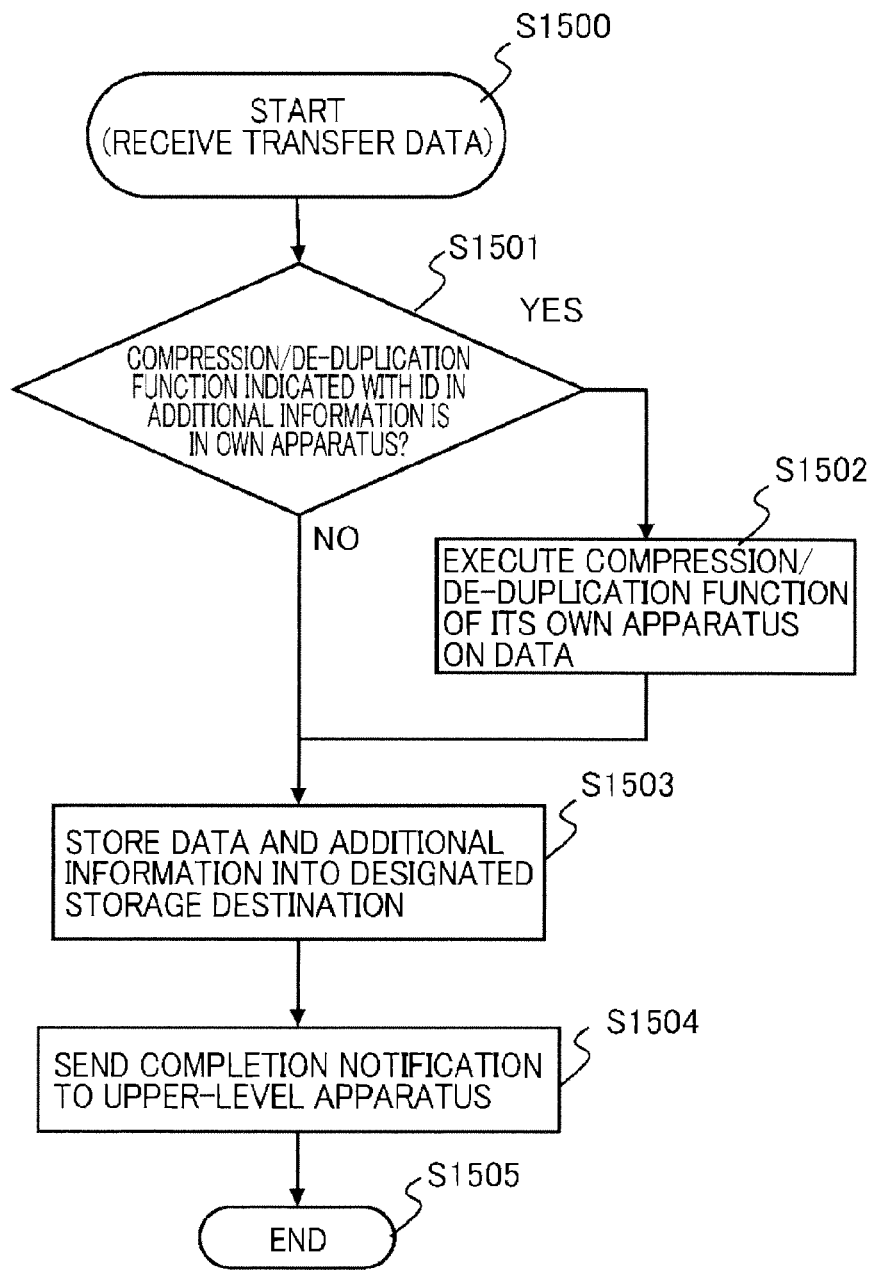
FIG. 15A is a flowchart showing an example of a processing flow common to the evaluation index registration processing and the backup processing in a lower-level apparatus implemented with the software of the present embodiment that recognizes additional information.
Figure 15B:
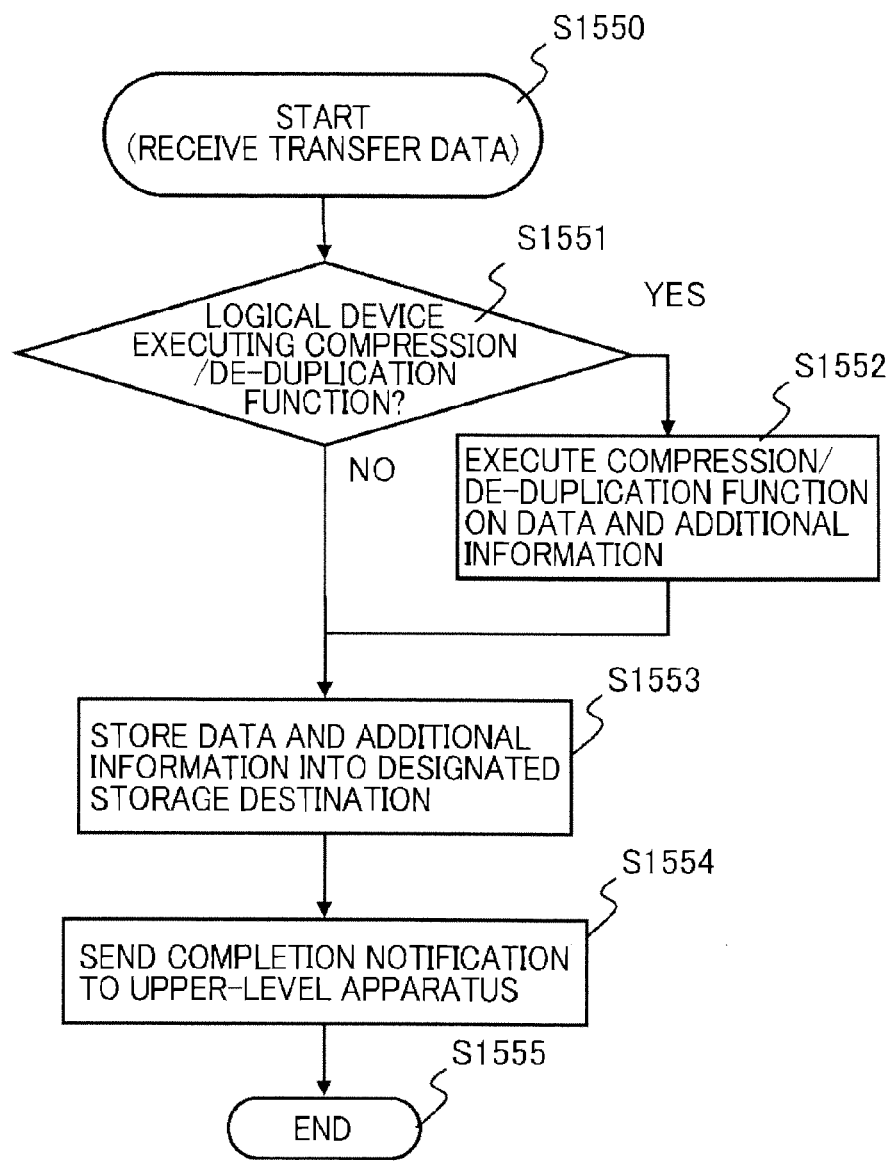
FIG. 15B is a flowchart showing an example of a processing flow common to the evaluation index registration processing and the backup processing in a lower-level apparatus without the software of the present embodiment that does not recognize additional information.

Next, evaluation index registration processing in a lower-level apparatus is described. FIGS. 15A and 15B show an example of an evaluation index registration processing flow in a lower-level apparatus respectively. Here, the lower-level apparatus represents a server 100 or a storage apparatus 200 of the transfer destination other than a server or a storage apparatus of the evaluation index allocation processing part, in the evaluation index registration processing flow illustrated in FIG. 14. Further, the evaluation index registration processing in the lower-level apparatus is used in a same manner in the backup processing as well.

For example, at S1409 of FIG. 14, if an apparatus designated as a storage destination is not a server or a storage apparatus of the evaluation index allocation processing part, target data is transferred to a server 100 or a storage apparatus 200 in which the designated storage destination exists, and upon receiving the transferred data, a processing flow of FIG. 15A (S1500) of the apparatus with the software of the present embodiment implemented that recognizes the additional information or a processing flow of FIG. 15B (S1550) of the apparatus without the software of the present embodiment that does not recognize the additional information is started. First, the processing flow of FIG. 15A (S1500) of the apparatus with the software of the present embodiment implemented that recognizes the additional information is described. A de-duplication processing part 1030 in the transfer destination apparatus determines whether or not the compression/de-duplication function indicated by the compression/de-duplication function ID 1210 in the additional information 1200 exists in the own apparatus (S1501), and if it is determined that the compression/de-duplication function indicated by the compression/de-duplication function ID 1210 in the additional information 1200 exists in the own apparatus (S1501, Yes), subjects the data to the compression/de-duplication processing in the own server or the storage apparatus and causes the processing to shift to S1503. If it is determined that the compression/de-duplication function indicated by the compression/de-duplication function ID 1210 in the additional information 1200 does not exist in the own apparatus (S1501, No), the de-duplication processing part 1030 stores the received data and additional information 1200, as is, into a designated storage destination (S1503). Next, the de-duplication processing part 1030 notifies completion of data storage to an upper-level apparatus of data transfer source and ends the processing (S1504, S1505).

Next, the processing flow of FIG. 15B (S1550) of the apparatus without the software of the present embodiment that does not recognizes the additional information is described. The server 100 or the storage apparatus 200 as the transfer destination determines whether or not the compression/de-duplication function is to be executed regarding the logical device as the transfer destination, and if it is determined that the compression/de-duplication function is to be executed (S1551, Yes), subjects the data and the additional information 1200 to the compression/de-duplication processing in the own server or the storage apparatus and causes the processing to shift to S1553. If it is determined that the compression/de-duplication function is not to be executed (S1551, No), the server 100 or the storage apparatus 200 as the transfer destination stores the received data and the additional information 1200, as is, into a designated storage destination (S1553). Next, the server 100 or the storage apparatus 200 as the transfer destination notifies completion of data storage to an upper-level apparatus of data transfer source and ends the processing (S1554, S1555).

Backup Processing

Figure 16:
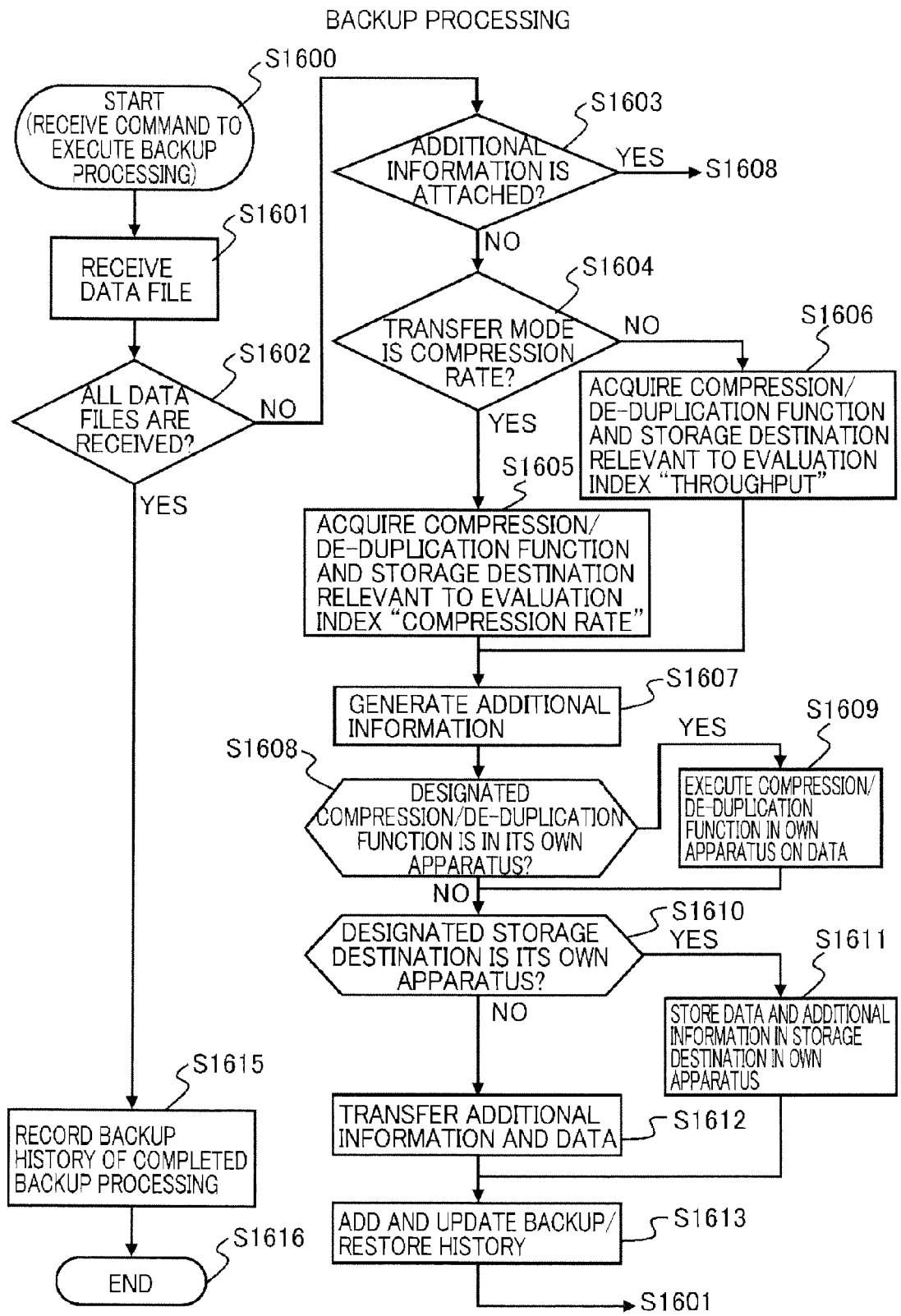
FIG. 16 is a flowchart showing an example of the backup processing flow.

Next, backup processing executed in the storage system 1 according to this embodiment is described. FIG. 16 shows an example of a backup processing flow. In the backup processing illustrated in FIG. 16, various backup processing types illustrated in FIG. 13 are executed by using an evaluation index table 1085 created by the evaluation index registration processing shown in FIG. 14 and FIG. 15.

First, upon receiving a command to execute the backup processing from the management computer 300, the de-duplication processing part 1030 receives a data file from a logical device of the backup source (for example, a storage source A of a server 100A) contained in the execution command (S1600 to S1601). The de-duplication processing part 1030 determines whether or not all target data files have been received from the backup source (S1602), and if it is determined that all data files have been received (S1602, Yes), records completed backup processing by adding to the backup/restoring history information table 1090, and ends the processing (S1615, S1616).

If it is determined that all data files have not been received yet (S1602, No), the de-duplication processing part 1030 determines whether or not the additional information 1200 is attached to the received data files (S1603), and if it is determined that the additional information 1200 is attached (S1603, Yes), causes the processing to shift to S1608. This is because attachment of the additional information 1200 to the received data indicates that the compression/de-duplication processing of the received data has been executed by a de-duplication processing part 1030 of the other apparatus.

If it is determined that the additional information 1200 is not attached to the received data files (S1603, No), the de-duplication processing part 1030 determines whether or not the transfer mode contained in the received backup processing execution command is the compression rate (S1604). If it is determined that the transfer mode is the compression rate (S1604, Yes), the de-duplication processing part 1030 acquires, by referring to the evaluation index table 1085 for a file type of the received data, a backup ID 10852 designated as backup processing which should be executed when the compression rate is prioritized. In the example of FIG. 10, when the file type is "doe", backup processing identified with a backup ID=00 where a sign "CR" is recorded is selected. Then, referring to the compression/de-duplication function ID registration table 1060 using a selected backup ID 10852, the de-duplication processing part 1030 acquires associated compression/de-duplication function ID 1062 and storage destination ID 1063 (S1605).

If it is determined that the transfer mode is not the compression rate but the throughput according to this embodiment (S1604, No), the de-duplication processing part 1030 refers to the evaluation index table 1085 for the file type of the received data and acquires a backup ID 10852 designated as backup processing which should be executed when the throughput is prioritized. In the example of FIG. 10, if the file type is "doe", backup processing identified with a backup ID=01 where a sign "TP" is recorded is selected. Then, the de-duplication processing part 1030 refers to the compression/de-duplication function ID registration table 1060 by using the selected backup ID 10852, and acquires associated compression/de-duplication function ID 1062 and storage destination ID 1063 (S1606).

Next, the de-duplication processing part 1030 generates the additional information 1200 related to the received data file and attaches to the data file (S1607). Next, the de-duplication processing part 1030 determines, by referring to the compression/de-duplication function ID registration table 1060, whether or not a compression/de-duplication function identified with the compression/de-duplication function ID 1062 acquired at S1605 or S1606 exists in the server or the storage apparatus of the de-duplication processing part (S1608), and if it is determined that the compression/de-duplication function exists therein (S1608, Yes), subjects the data to the compression/de-duplication processing by the compression/de-duplication function in the own server or the storage apparatus (S1609), and causes the processing to shift to S1610. If it is determined that the compression/de-duplication function does not exists in the own server or the storage apparatus (S1608, No), the de-duplication processing part 1030 determines whether or not a storage destination logical device identified with the storage destination ID 1073 acquired at S1605 or S1606 exists in the server or the storage apparatus of the de-duplication processing part (S1610). If it is determined that the storage destination logical device exists therein (S1610, Yes), the de-duplication processing part 1030 transfers the data file to be processed and the additional information 1200 to the server 100 or the storage apparatus 200 in which the storage destination logical device identified with the storage destination ID 1073 is provided (S1613). If it is determined that the storage destination logical device does not exist therein (S1610, No), the de-duplication processing part 1030 instructs performing the backup processing regarding the storage destination identified with the additional information 1200 (S1612), and stores the data file of backup target and the additional information 1200 in the storage destination logical device in the own apparatus (S1612). Next, the de-duplication processing part 1030 adds the executed backup processing to the backup/restoring history information table 1090 and updates the same (S1613) and returns the processing to S1601.

According to the backup processing described above, an appropriate compression/de-duplication function can be selected and used according to the file type of a backup target data and operational requirements related to backup processing.

Restore Processing

Figure 17:
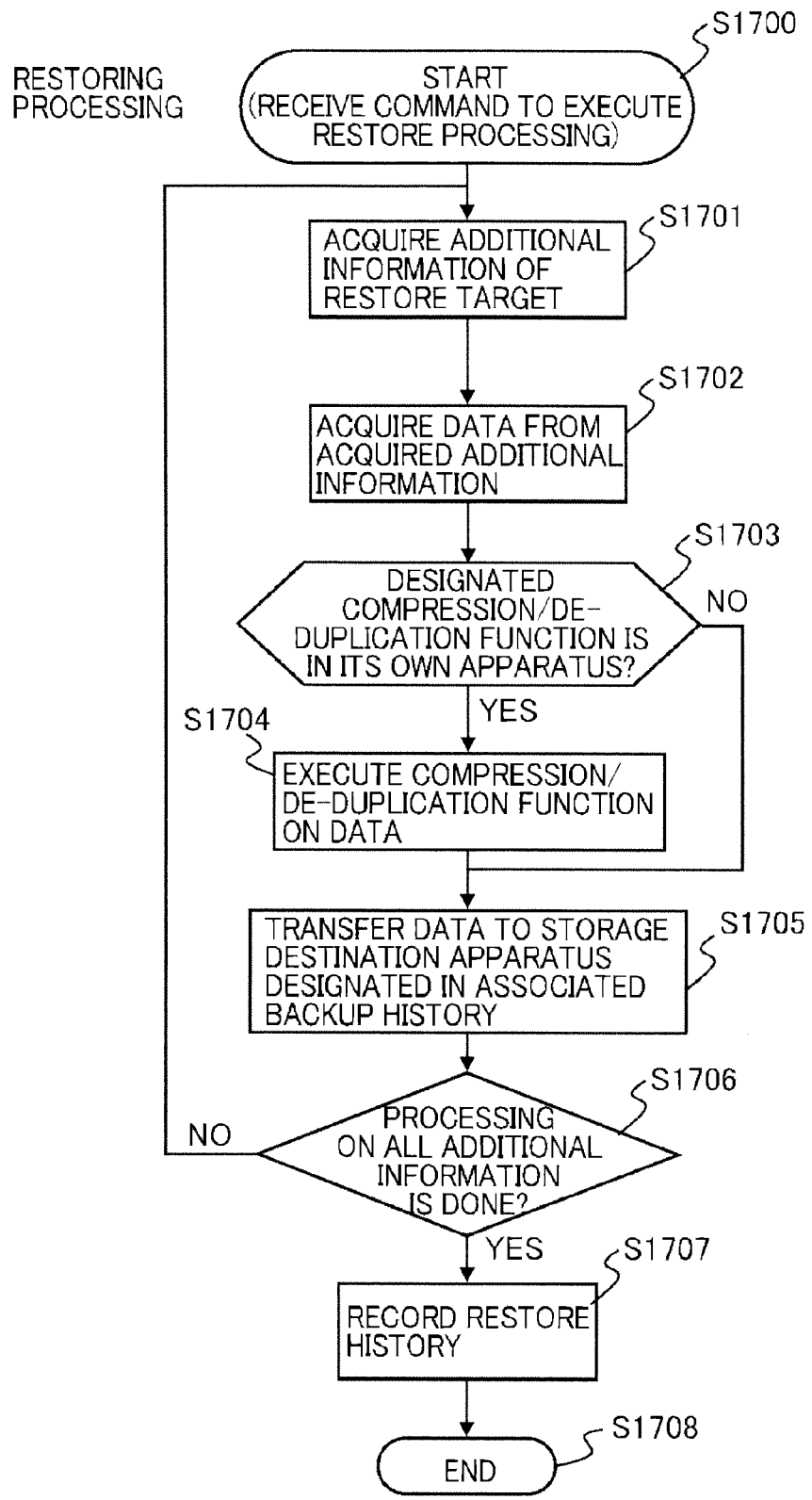
FIG. 17 is a flowchart showing an example of the restoring processing flow.

Next, restoring processing in the storage system 1 according to this embodiment is described. FIG. 17 shows an example of a restoring processing flow executed in the storage system 1. The restoring processing is processing to restore a backed-up data file in a backup destination to a logical device of the backup source. According to this embodiment, an appropriate compression/de-duplication function is selected according to a data file when performing backup processing. Therefore, in the restoring processing, the data file needs to be restored using a compression/de-duplication function used in the backup processing.

First, the backup/restoring processing part 1050 of a server 100 or a storage apparatus 200 which received a command from the management computer 300 to execute the restoring processing acquires, by referring to the backup/restoring history information table 1090, additional information storage destinations 10951 to 10953 associated with the backup destination (restoring source) information 1095 according to the backup source (restoring destination) information 1094 for a restoring target logical device and the additional information 1200 on the basis of the additional information storage destinations (S1700, S1701). Next, the backup/restoring processing part 1050 acquires a de-duplication function ID 1210 from the acquired additional information 1200 (S1702), and determines whether or not a compression/de-duplication function identified with the compression/de-duplication function ID 1210 exists in the own server or the storage apparatus (S1703). If it is determined that the compression/de-duplication function exists therein (S1703, Yes), the de-duplication processing part 1030 restores the restoring target data by using the compression/de-duplication function (S1704). If it is determined that the compression/de-duplication function does not exist therein (S1703, No), the de-duplication processing part 1030 acquires, by referring to the backup/restoring history information table 1090, a history related to backup processing associated with the restoring processing to be executed, since non-existence of the compression/de-duplication function indicates that compression/de-duplication processing of the restoring target data has been executed by another apparatus which is a backup source. Then, the de-duplication processing part 1030 transfers the restoring target data to a server 100 or a storage apparatus 200 identified with the backup source (restoring destination) information 1090 recorded in the history thereof (S1705).

Next, the de-duplication processing part 1030 determines whether or not all additional information 1200 recorded in the backup/restoring history information table 1090 for the restoring target data has been processed (S1706), and if it is determined that all additional information 1200 has been processed (S1706, Yes), the de-duplication processing part 1030 records the executed restoring processing in the backup/restoring history information table 1090, and ends the processing (S1707, S1708). If it is determined that all additional information 1200 has not been processed yet (S1706, No), the de-duplication processing part 1030 repeats execution of S1701 and subsequent processing.

According to the restoring processing described above, an appropriate restoration can be performed by using a compression/de-duplication function applied in the backup processing according to the file type of a backup target data.

Restore Processing in Lower-Level Apparatus

Figure 18A:
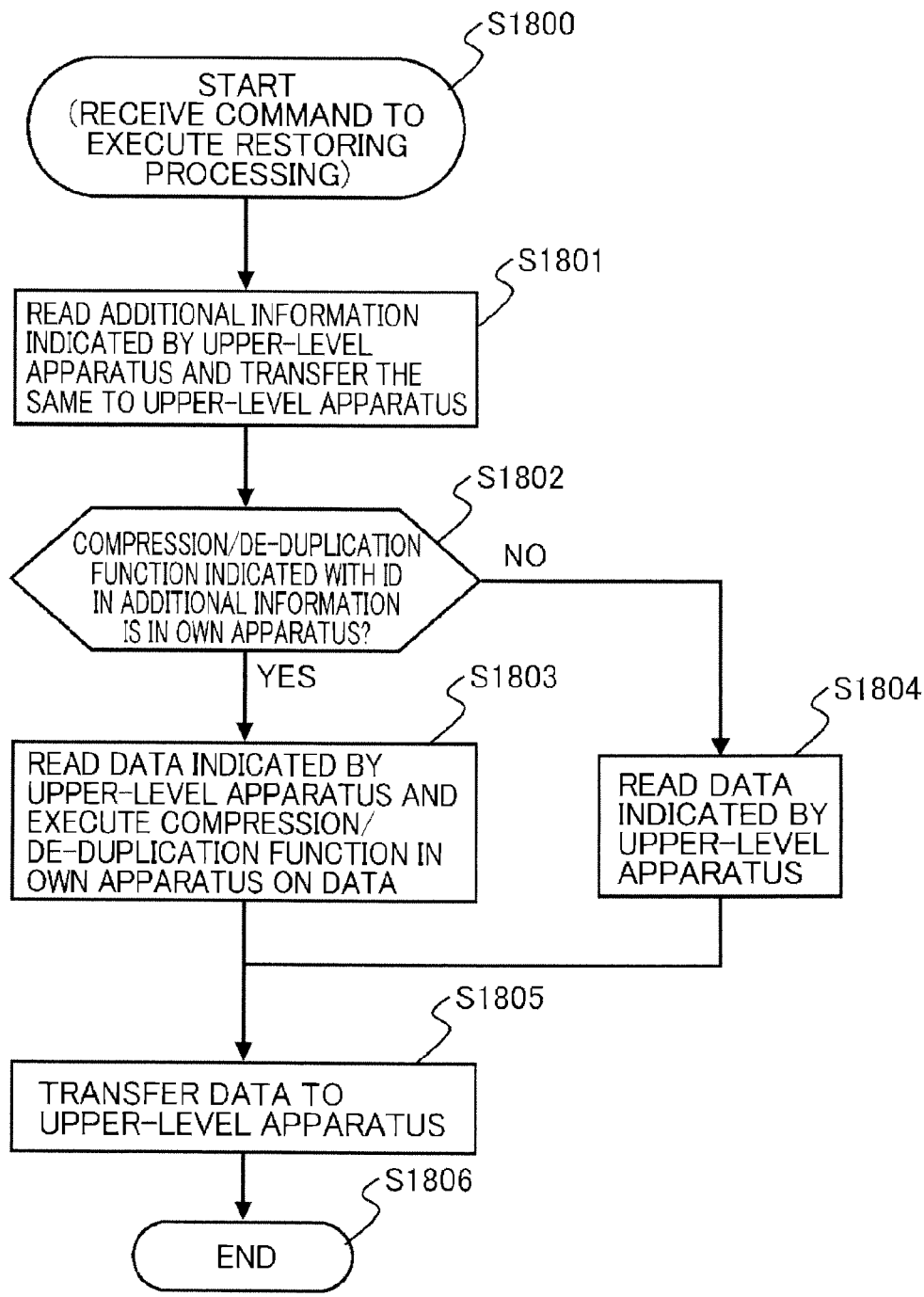
FIG. 18A is a flowchart showing an example of the restoring processing flow in a lower-level apparatus implemented with the software of the present embodiment that recognizes additional information.
Figure 18B:
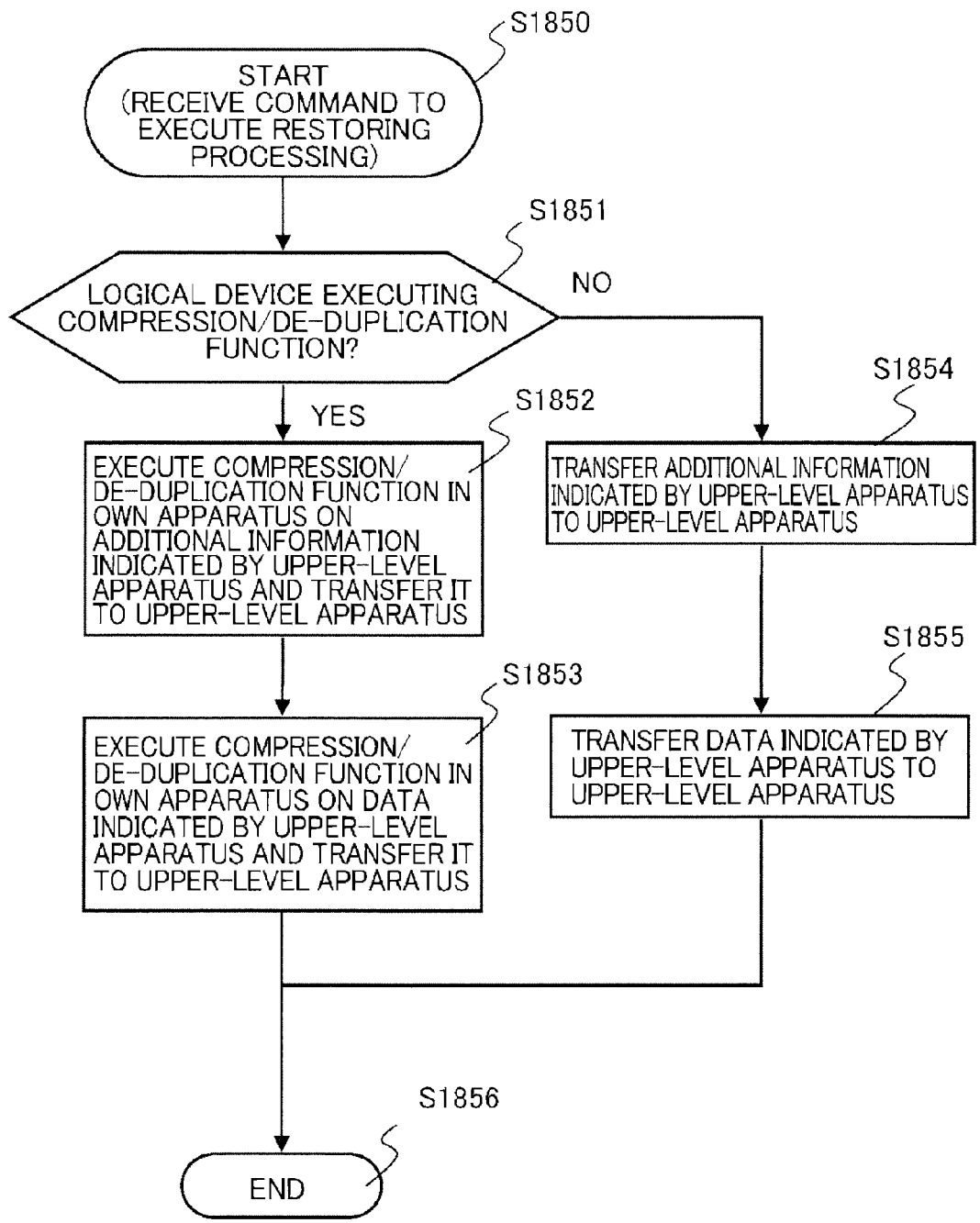
FIG. 18B is a flowchart showing an example of the restoring processing flow in a lower-level apparatus without the software of the present embodiment that does not recognize additional information.

Next, restoring processing in a lower-level apparatus is described. FIGS. 18A and 18B show an example of a restoring processing flow in a lower-level apparatus respectively. Similarly with the backup processing, the lower-level apparatus represents a server 100 or a storage apparatus 200, which is a transfer source other than the server or the storage apparatus in the restoring processing flow illustrated in FIG. 17.

For example, the retrieval of the additional information 1200 of the restoring target at S1701 and the retrieval of the data indicated by the additional information 1200 as retrieved at S1702 in FIG. 17 correspond to the restoring processing in the lower-level apparatus. The processing flow of FIG. 18A is started in the restoring processing by the lower-level apparatus with the software of the present embodiment implemented that recognizes the additional information. On the other hand, the processing flow of FIG. 18B is started in the restoring processing by the lower-level apparatus without the software of the present embodiment that does not recognize the additional information. First, the processing flow of FIG. 18A for the restoring processing by the lower-level apparatus with the software of the present embodiment implemented that recognizes the additional information is described. The backup/restoring processing part 1050 in a transfer destination apparatus of a restoring source reads out the additional information 1200 of the restoring target data from a logical device in a restoring source designated in the additional information 1200 attached to the received data, and transfers the additional information 1200 as read to the upper-level server 100 or storage apparatus 200 (S1801). Next, the backup/restoring processing part 1050 reads the additional information 1200 indicated at S1701 by the upper-level server 100 or storage apparatus 200, and determines whether or not a compression/de-duplication function designated by the compression/de-duplication function ID 1210 in the additional information 1200 exists in the server or the storage apparatus of the backup/restoring processing part (S1802). If it is determined that the compression/de-duplication function as designated exists therein (S1802, Yes), the backup/restoring processing part 1050 reads the data indicated at S1702 by the upper-level server 100 or storage apparatus 200, subjects the data as read to the compression/de-duplication function in the own server 100 or the storage apparatus 200 (S1803), and causes the processing to shift to S1805. If it is determined that the designated compression/de-duplication function does not exist therein (S1802, No), the backup/restoring processing part 1050 reads the data indicated at S1702 by the upper-level server 100 or storage apparatus 200 (S1804). Then, the backup/restoring processing part 1050 transfers the data to the upper-level apparatus of the transfer destination, and ends the processing (S1805, S1806).

Next, the processing flow of FIG. 18B for the restoring processing by the lower-level apparatus without the software of the present embodiment that does not recognize the additional information is described. The backup/restoring processing part 1050 in a transfer source apparatus of a restoring source determines whether or not a compression/de-duplication function is to be performed to the logical device in the restoring source (S1851), and if it is determined that the compression/de-duplication function is to be performed (S1851, Yes), the backup/restoring processing part 1050 restores the data and the additional information 1200 with the compression/de-duplication function in the own server 100 or the storage apparatus 200 (S1852), and transfers the restored data and the additional information 1200 to the upper-level server 100 or storage apparatus 200 (S1853), and causes the processing to shift to S1856. The backup/restoring processing part 1050 in a transfer source apparatus of a restoring source determines that the compression/de-duplication function is not to be performed (S1851, No), the backup/restoring processing part 1050 transfers the read data and the additional information 1200 as is to the upper-level server 100 or storage apparatus 200 (S1854, S1855), and causes the processing to shift to S1856.

According to the restoring processing in a lower-level apparatus described above, a data file stored in an apparatus other than a restoring destination can be restored by using an appropriate compression/de-duplication function used when the data file was backed up.

Processing Related to Upgrading of Server 100 or Storage Apparatus 200

Figure 19A:
FIG. 19A is a diagram showing an example of the evaluation result table 1080 and the evaluation index table 1085 before upgrading, in connection with upgrading of a storage apparatus provided in the server 100 or the storage apparatus 200.
Figure 19B:
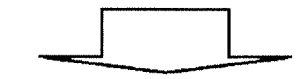
FIG. 19B is a diagram showing an example of the evaluation result table 1080 and the evaluation index table 1085 when a storage apparatus provided in the server 100 or the storage apparatus 200 is upgraded.

Next, processing related to an upgraded compression/de-duplication function implemented in a server 100 or a storage apparatus 200 in the storage system 1 according to this embodiment is described. FIG. 19A and FIG. 19B show configuration examples of the evaluation result table 1080 and the evaluation index table 1085 before and after updating a program configuring the de-duplication processing part 1030 which achieves compression/de-duplication functions implemented in a server 100 or a storage apparatus 200. As described with reference to FIG. 4, the de-duplication processing part 1030 is a program in a form of a micro program or a plug-in executed by CPU 110 of a server 100 or a storage apparatus 200. Upgrading of a server 100 or a storage apparatus 200 represents an updating of an applicable program for enhancing the function of the de-duplication processing part 1030.

Referring to the evaluation result table 1080 before upgrading of FIG. 19A, when the file type of a target data file is "doc", the maximum compression rate is 40% of the backup ID=01, and the maximum throughput is 120 MB/s of the backup ID=00. For this reason, in the evaluation index table 1085 of FIG. 19A, the backup ID=00 and the backup ID=01 have records of TP and CR respectively in the file type "doc."

In contrast to this, the evaluation result table 1080 after upgrading shown in FIG. 19B indicates an upgraded de-duplication processing part 1030 having a compression/de-duplication function identified with the backup ID=03 has a compression rate enhanced from 30% to 45% and a throughput from 118 MB/s to 125 MB/s. For this reason, in the evaluation index table 1085 of FIG. 19B, the backup ID=03 has a record of CR and TP in the file type doc. The association relationship between the backup ID 1061 and the compression/de-duplication function 1062 is prescribed in the compression/de-duplication function ID registration table 1060 of FIG. 6.

As described above, the processing related to upgrading of a server 100 or a storage apparatus 200 is processing to re-execute the evaluation index registration processing described with reference to FIG. 14, by including a server or a storage apparatus in which a de-duplication processing part 1030 is upgraded. Thus, a processing flow thereof is basically same as the evaluation index registration processing flow illustrated in FIG. 14, except a difference from the processing flow of FIG. 14 in that the processing is executed when the evaluation index allocation processing part 1040 receives notification from the management computer 300 that upgrading has been executed, or when the evaluation index allocation processing part 1040 detects updating of the evaluation result table 1080.

Processing Related to Adding of Storage Destination to Server 100 or Storage Apparatus 200

Figure 20A:
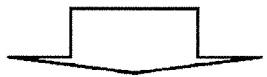
FIG. 20A is a diagram showing an example of the evaluation result table 1080 and the evaluation index table 1085 before addition, in connection with an addition of a storage apparatus provided in the server 100 or the storage apparatus 200.
Figure 20B:
FIG. 20B is a diagram showing an example of the evaluation result table 1080 and the evaluation index table 1085 when a storage apparatus is added to the server 100 or the storage apparatus 200.

Next, processing related to an addition of the type of implemented compression/de-duplication functions as a result of an addition of a server 100 or storage apparatus 200 in the storage system 1 according to this embodiment is described. FIG. 20A and FIG. 20B show configuration examples of the evaluation result table 1080 and the evaluation index table 1085 before and after an addition of the type of compression/de-duplication functions implemented in the storage system 1 as a result of an addition of a server 100 or a storage apparatus 200.

Referring to the evaluation result table 1080 before addition of a compression/de-duplication function in FIG. 20A, three types of compression/de-duplication functions identified with backup IDs 00 to 02 are implemented in the storage system 1. When the file type of a target data file is "doc", the maximum compression rate is 40% of the backup ID=01, and the maximum throughput is 120 MB/s of the backup ID=00. For this reason, in the evaluation index table 1085 of FIG. 20A, the backup ID=00 and the backup ID=01 have records of TP and CR respectively in the file type "doc."

In contrast to this, the evaluation result table 1080 after an addition of a compression/de-duplication function shown in FIG. 20B indicates that an addition of a de-duplication processing part 1030 having a compression/de-duplication function identified with the backup ID=03 in the storage system 1 enables the use of a compression/de-duplication function having a compression rate of 45% and a throughput of 125 MB/s. For this reason, in the evaluation index table 1085 of FIG. 19B, the backup ID=03 has a record of CR and TP in the file type "doc."

As described above, the processing related to an addition of a server 100 or a storage apparatus 200 is the processing which, similarly with the processing related to upgrading of a de-duplication processing part 1030, re-executes the evaluation index registration processing described with reference to FIG. 14, by including a server 100 or a storage apparatus 200 in which a de-duplication processing part 1030 is upgraded. Thus, a processing flow thereof is basically the same as the evaluation index registration processing flow illustrated in FIG. 14, except a difference from the processing flow of FIG. 14 in that the processing is executed when the evaluation index allocation processing part 1040 receives notification from the management computer 300 that the number of usable compression/de-duplication functions has increased as a result of an addition of a server 100 or a storage apparatus 200, or when the evaluation index allocation processing part 1040 detects updating of the evaluation result table 1080.

Processing Related to Dismantling of a Storage Destination in Server 100 or Storage Apparatus 200

Figure 21:
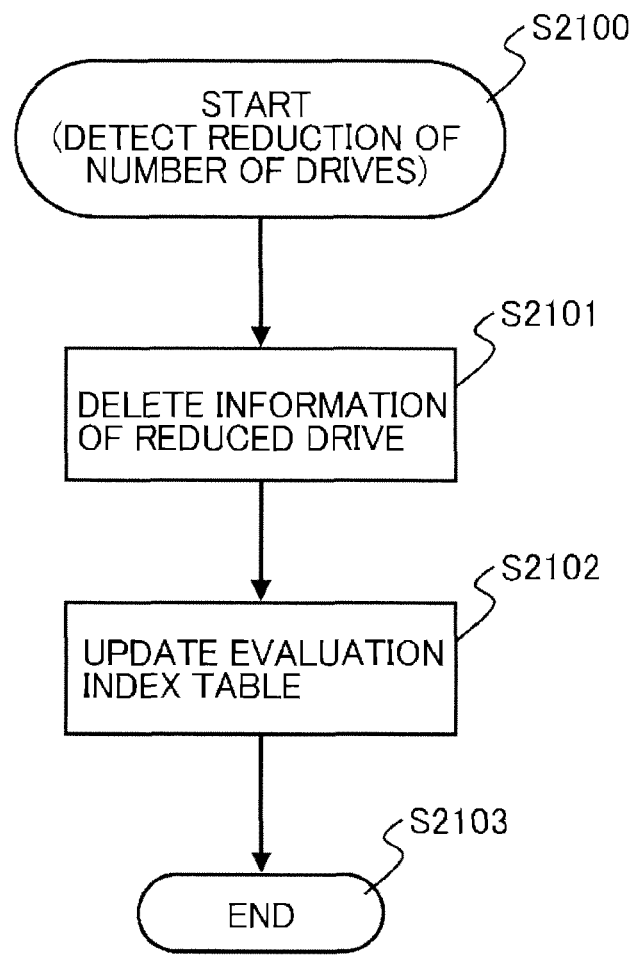
FIG. 21 is a diagram showing an example of the evaluation index registration processing flow when a storage apparatus provided in the server 100 or the storage apparatus 200 is dismantled.

Next, processing related to a reduction in the types of implemented compression/de-duplication functions as a result of dismantling of a server 100 or storage apparatus 200 in the storage system 1 according to this embodiment is described. FIG. 21 shows an example of a processing flow related to dismantling of a storage destination of a server 100 or a storage apparatus 200. The processing flow illustrated in FIG. 21 is started when the evaluation index allocation processing part 1040 receives a notification from the management computer 300 that a server 100 or a storage apparatus 200 has been dismantled, or when the evaluation index allocation processing part 1040 detects that the compression/de-duplication function ID registration table 1060 or the evaluation result table 1080 has been updated by deleting one of the entries (S2100). Next, the evaluation index allocation processing part 1040 deletes information related to a storage destination logical drive and a compression/de-duplication function included in the dismantled server 100 or storage apparatus 200 from the evaluation result table 1080 (S2101). Further, the evaluation index allocation processing part 1040 updates the evaluation index table 1085 based on the updated evaluation result table 1080, and ends the processing (S2102, S2103).

Figure 22A:
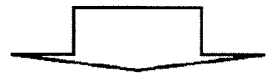
FIG. 22A relates to dismantling of a storage apparatus provided in the server 100 or the storage apparatus 200, and is a diagram showing an example of the evaluation result table 1080 and the evaluation index table 1085 before dismantling.
Figure 22B:
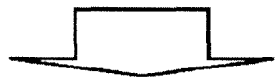
FIG. 22B is a diagram showing an example of the evaluation result table 1080 and the evaluation index table 1085 when a storage apparatus provided in the server 100 or the storage apparatus 200 is dismantled.

FIG. 22A and FIG. 22B show configuration examples of the evaluation result table 1080 and the evaluation index table 1085 before and after a reduction in the types of compression/de-duplication functions implemented in the storage system 1 as a result of dismantling of a server 100 or a storage apparatus 200.

Referring to the evaluation result table 1080 before dismantling of a compression/de-duplication function in FIG. 22A, four types of compression/de-duplication functions identified with backup IDs 00 to 03 are implemented in the storage system 1. When the file type of a target data file is "doc", the backup ID=03 has maximum compression rate and throughput. For this reason, in the evaluation index table 1085 of FIG. 22A, the backup ID=03 has records of CR and TP in the file type "doc."

In contrast to this, the evaluation result table 1080 after the dismantling of the compression/de-duplication function shown in FIG. 22B indicates that the compression rate of 40% of the backup ID=01 and the throughput of 120 MB/s of the backup ID=00 are maximum as a result of the dismantling of a de-duplication processing part 1030 having a compression/de-duplication function identified with the backup ID=03 from the storage system 1. For this reason, in the evaluation index table 1085 of FIG. 22B, the backup ID=00 and the backup ID=01 have records of TP and CR, respectively, in the file type "doc."

Through the processing described above, even when the server 100 or the storage apparatus 200 is dismantled, re-allocation of the evaluation index can be automatically executed and an appropriate compression/de-duplication function is applied according to the file type of a data file.

As described above in detail according to one embodiment of the present invention, the present invention provides a storage system and a method for controlling the storage system, which is capable of achieving a more efficient backup processing by appropriately using a different de-duplication function or data compression function according to the type of backup target data.

Although described in line with embodiments of the present invention with reference to the drawings, the present invention is not limited to the embodiments. It should be understood that any change and modification example and equivalent thereof may be made in the present invention without departing from the spirit and scope thereof.

The invention claimed is:

1. A storage system configured to provide a data storage area to an external apparatus, the storage system comprising at least:
   a first information processing apparatus, comprising a processor, including a first logical storage area forming the data storage area, and a first data processing part configured to perform processing to reduce the storage capacity used by a backup target data in the first logical storage area, and
   a second information processing apparatus, comprising a processor, communicatively coupled to the first information processing apparatus and including a second logical storage area forming the data storage area, and a second data processing part configured to perform processing to reduce the storage capacity used by a backup target data in the second logical storage area, wherein
the first information processing apparatus further includes:
an evaluation index allocation processing part configured to determine which one of the first data processing part and the second data processing part to use to process a backup target data according to an evaluation index prescribed as a data format of the backup target data, and
a backup processing part configured to, when performing backup processing of the backup target data, refer to an association relationship between the data format of the backup target data and any of the first and second data processing parts determined by the evaluation index allocation processing part, and cause the backup target data to be processed by using the first or second data processing part associated with the data format of the backup target data,
the evaluation index allocation processing part is configured to cause each of the first data processing part and the second data processing part to process the backup target data, and to determine the association relationship between the data format of the backup target data and the data processing part on the basis of processing results of the first and second data processing parts,
processing executed in each of the first data processing part and the second data processing part includes at least one of data compression processing of reducing the data size of the backup target data or de-duplication processing of preventing data redundant storage in the first logical storage area or the second logical storage area serving as a backup destination,
the processing results in the first data processing part and the second data processing part are a throughput value calculated on the basis of a time taken for the backup processing and measured when each of the first data processing part and the second data processing part processes the backup target data, and a compression rate calculated as a capacity ratio between the backup target data before and the backup target data after the backup processing,
when any of the first data processing part and the second data processing part processes the backup target data, the first data processing part or the second data processing part processing the backup target data is configured to create additional information of a backup target file, and stores the additional information into a predetermined storage destination in the storage system, the additional information including information identifying the first data processing part or the second data processing part processing the backup target data, and information indicating a storage destination of the backup target data processed by the first data processing part or the second data processing part,
the first information processing apparatus or the second information processing apparatus includes a restoring processing part configured to restore the backup target data backed up in the backup processing to the first logical storage area or the second logical storage area serving as a backup source, backup history information including:
information identifying the first logical storage area or the second logical storage area serving as a backup source in the backup processing; information identifying the first logical storage area or the second logical storage area serving as a backup destination in the backup processing, and a storage location of additional information generated in the backup processing, the backup source information, the backup destination information and the storage location being associated with each other,
the restoring processing part is configured to refer to the backup history information containing information of the backup destination serving as a restoring source in which a restoring target data is stored, and to cause the first data processing part or the second data processing part designated by the additional information recorded in the backup history information to execute the restoring processing of the backup target data,
the evaluation index allocation processing part is configured to record an association relationship between the data format of the backup target data and the data processing part for each of a case of achieving the highest compression rate and a case of achieving the largest throughput value,
the backup processing part is configured to execute the backup processing by using the first or second data processing part determined to achieve the highest compression rate if the compression rate is prioritized in a backup processing execution command, and by using the first or second data processing part determined to achieve the largest throughput value if the throughput value is prioritized in a backup processing execution command,
when an update of a function of the first data processing part or the second data processing part in the storage system is detected, or when a third information processing apparatus including a third data processing part having a function similar to that of the first data processing part or the second data processing part is provided in the storage system, the evaluation index allocation processing part is configured to cause the first data processing part, the second data processing part and the third data processing part to process the backup target data, and is configured to determine the association relationship between the data format of the backup target data and any of the first, second and third data processing parts on the basis of processing results of the first, second and third data processing parts, and
in the case that the storage system further comprises a third information processing apparatus including a third data processing part having a function similar to that of the first data processing part or the second data processing part, when a dismantling of the first information processing apparatus including the first data processing part or the second information processing apparatus including the second data processing part from the storage system is detected, the evaluation index allocation processing part is configured to determine again the association relationship between the data format of the backup target data and the data processing part by excluding the dismantled first data processing part or second data processing part.

* * * * *